United States Patent
Fanfani

(10) Patent No.: US 11,541,631 B2
(45) Date of Patent: Jan. 3, 2023

(54) EASY OPENING FILM FOR VACUUM SKIN PACKAGING

(71) Applicant: Andrea Fanfani, Milan (IT)

(72) Inventor: Andrea Fanfani, Milan (IT)

(73) Assignee: Cryovac, LLC, Charlotte, NC (US)

( * ) Notice: Subject to any disclaimer, the term of this patent is extended or adjusted under 35 U.S.C. 154(b) by 335 days.

(21) Appl. No.: 16/069,909

(22) PCT Filed: Mar. 7, 2017

(86) PCT No.: PCT/EP2017/055365
§ 371 (c)(1),
(2) Date: Jul. 13, 2018

(87) PCT Pub. No.: WO2017/153434
PCT Pub. Date: Sep. 14, 2017

(65) Prior Publication Data
US 2019/0009499 A1   Jan. 10, 2019

(30) Foreign Application Priority Data

Mar. 7, 2016 (EP) ................................. 16158986

(51) Int. Cl.
| | | |
|---|---|---|
| *B32B 7/06* | (2019.01) | |
| *B32B 27/08* | (2006.01) | |
| *B65B 31/02* | (2006.01) | |
| *B65D 75/30* | (2006.01) | |
| *B65D 81/34* | (2006.01) | |
| *B32B 27/30* | (2006.01) | |
| *B32B 27/34* | (2006.01) | |
| *B32B 27/10* | (2006.01) | |
| *B32B 27/36* | (2006.01) | |
| *B32B 15/20* | (2006.01) | |
| *B32B 15/08* | (2006.01) | |
| *B32B 27/32* | (2006.01) | |

(52) U.S. Cl.
CPC ................ *B32B 7/06* (2013.01); *B32B 15/08* (2013.01); *B32B 15/20* (2013.01); *B32B 27/08* (2013.01); *B32B 27/10* (2013.01); *B32B 27/302* (2013.01); *B32B 27/304* (2013.01); *B32B 27/306* (2013.01); *B32B 27/308* (2013.01); *B32B 27/32* (2013.01); *B32B 27/34* (2013.01); *B32B 27/36* (2013.01); *B65B 31/024* (2013.01); *B65D 75/305* (2013.01); *B65D 81/3461* (2013.01); *B32B 2270/00* (2013.01); *B32B 2307/31* (2013.01); *B32B 2307/50* (2013.01); *B32B 2439/70* (2013.01)

(58) Field of Classification Search
CPC ....... B32B 7/06; B32B 27/306; B32B 27/308; B32B 27/32; B32B 27/08; B32B 2270/00; B32B 2307/31; B32B 2439/70; B65D 75/305
See application file for complete search history.

(56) References Cited

U.S. PATENT DOCUMENTS

| | | | |
|---|---|---|---|
| 4,927,691 A | * | 5/1990 | Bekele .................... B32B 27/08 428/35.2 |
| 5,346,735 A | | 9/1994 | Logan et al. |
| 2002/0115795 A1 | * | 8/2002 | Shang ....................... B32B 7/06 525/192 |
| 2007/0092748 A1 | * | 4/2007 | Suzuki ................ B32B 38/0012 428/500 |
| 2011/0048998 A1 | * | 3/2011 | Riccio .................. B65D 75/305 206/497 |

FOREIGN PATENT DOCUMENTS

| | | | | |
|---|---|---|---|---|
| EP | 0192131 | | 8/1986 | |
| EP | 1300238 A2 | * | 4/2003 | .......... C08L 23/0815 |
| EP | 1541335 | | 6/2005 | |
| EP | 2361749 | | 8/2011 | |
| WO | 9954398 | | 10/1999 | |
| WO | 2016064557 | | 4/2016 | |
| WO | WO-2016174111 A1 | * | 11/2016 | .......... B65D 81/2084 |

* cited by examiner

*Primary Examiner* — Callie E Shosho
*Assistant Examiner* — Bethany M Miller
(74) *Attorney, Agent, or Firm* — Jason R. Womer

(57) ABSTRACT

The present invention relates to cross-linked vacuum skin packaging (VSP) films used as top webs for VSP packages endowed with easy opening features and to VSP packages obtained therefrom. The films of the invention comprise at least one layer of a frangible blend of incompatible polymers. The easy-to-open VSP packages obtained therefrom may advantageously include very simple and cheap supports.

21 Claims, 7 Drawing Sheets

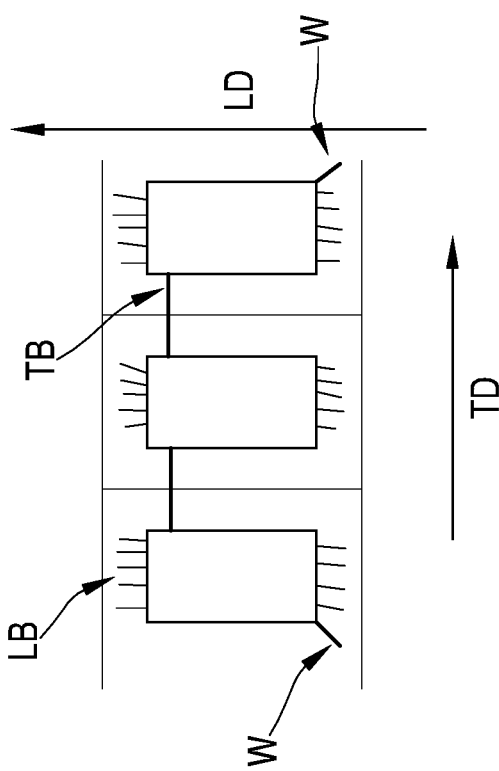
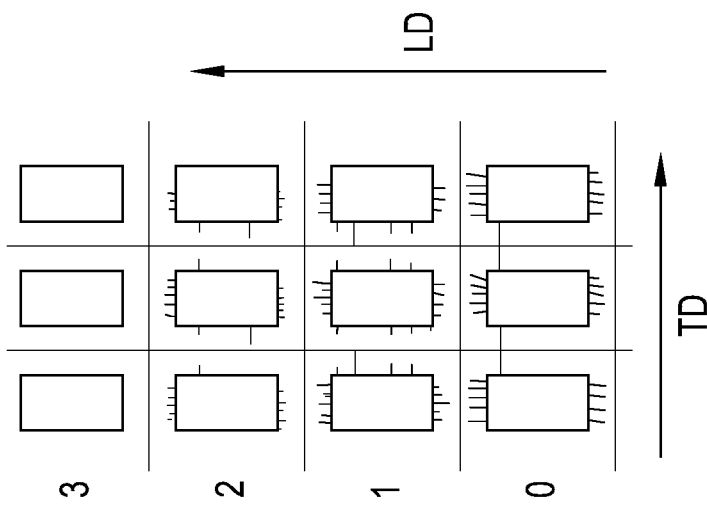

ns and packages made therefrom, in particular it relates to vacuum skin packaging (VSP) films used as top webs for VSP packages endowed with easy opening features.

EASY OPENING FILM FOR VACUUM SKIN PACKAGING

The present invention relates to packaging films and packages made therefrom, in particular it relates to vacuum skin packaging (VSP) films used as top webs for VSP packages endowed with easy opening features.

Furthermore, the present invention relates to an easy-to-open vacuum skin package suitable for the presentation and preservation of a food product and suitable for use in cooking, re-heating and/or thawing the packaged food product in a microwave oven without the need for prior removal of the top web or prior manual opening of the package. Finally, the present invention relates to an easy-to-open vacuum skin package and to related top films further characterized by anti-odour activity.

BACKGROUND OF THE INVENTION

In packaging, there is a need for films that can be used to securely package articles and at the same time allow the easy openability of the package.

A wide variety of products, especially food products like meat, sausages, cheese and the like, are being offered in visually attractive packages made from two thermoplastic webs or of a top flexible thermoplastic web and a bottom support, by using vacuum skin packaging.

In a vacuum skin packaging process, a product is placed on the support, that can be flat or shaped, e.g., tray-shaped, bowl-shaped or cup-shaped (called "bottom" web), and the supported product is then passed to a chamber where a "top" web is first drawn upward against a heated dome and then draped down, upon and around the product, and against the support, the space between the upper film and the support having been evacuated by differential air pressure. The top heated film thus forms a tight skin around the product and seals to the support not covered by the product.

In this kind of packaging process, the whole surface of the top film exceeding the product is sealed to the support all around the product, under vacuum, and the wide area to peel makes the package difficult to open and it may require the use of scissors, knives or other cutting and dangerous devices. To overcome this problem, packages that can be manually opened called "easy-to-open" or "EZO" packages have been introduced into the market. Generally, EZO packages are opened by manually pulling apart the top web from the bottom, normally starting from a point like a corner of the package where the upper web has purposely not been sealed to the support.

The easy-to-open packages of the prior art essentially exploited three opening mechanisms.

In the first one ("peelable easy opening') the package is opened by separating the two webs at the seal interface.

In the second mechanism ("adhesive failure') the opening of the package is achieved through delamination of the seal layer—of the bottom or of the top web—from the underlying remaining layer(s) of the support or of the top respectively. When the delamination reaches the area of the packed products, a second breakage through the sealing layer takes place and a portion of sealing layer is left sealed to the opposite web.

The third system is based on a "cohesive failure" mechanism. In this latter system, easy opening is achieved by internal rupture of a seal layer or of an adjacent layer that, during opening of the package, breaks along a plane parallel to the layer itself.

Easy-to-open VSP packages based on cohesive failure are disclosed, for instance, in EP192131B1, which describes an easy-to-open package with a bottom web seal layer comprising a binary blend of an ionomer and a modified ethylene/vinyl acetate copolymer.

This system is based on the different chemical nature of the two components. The two polymers are only partially compatible and consequently the material fails when a transverse force is applied to this layer thus opening the package.

VSP packages, comprising improved easy opening cohesive failure blends (EZO blends also named frangible blends) in a non-cross-linked bottom web, are disclosed in WO9954398A1 in the name of Cryovac Inc.

This document does not specifically disclose nor exemplifies any embodiment in which the EZO blend is placed in the top web. Furthermore, it never discloses or suggests cross-linking EZO films comprising a layer of EZO frangible blend: in the packages disclosed in WO9954398A1, the bottom web including the EZO frangible blend is never cross-linked.

The EZO VSP packages taught in this document require both top and bottom webs of a certain degree of complexity.

U.S. Pat. No. 5,346,735 describes a multilayer gas barrier composite film, which includes coextruded permeable and impermeable films, useful for VSP packaging.

For blooming the packaged meat, the impermeable film may be peeled off and separated from the permeable film.

The separation of the films of the composite occurs by delamination of layers (adhesive failure at the interface) and not by cohesive failure of incompatible polymers within a layer.

Incorporating the EZO frangible blend in the bottom web, as in the EZO VSP packages based on cohesive failure mechanism currently on the market, requires highly engineered bottom webs, which, in addition to good mechanics for the supporting function, to possible formability, sealing and barrier properties, need also to include the easy opening features.

As a consequence, due to the very high and generally different requirements needed both for top and bottom components, the manufacture of the current EZO VSP packages having the EZO feature in the bottom web does not allow to use simple, cheap, standard supports not tailored for the specific destination of use. In other words, the current EZO VSP solution is technologically quite complex, has little versatility and, consequently, it is rather expensive.

Accordingly, there is still the need for VSP packages that, even if endowed with all the properties mentioned above and, particularly, of an easy opening, would include much simpler and cheaper bottom structures, thus significantly reducing the complexity of bottom support manufacturing and the related costs.

SUMMARY OF THE INVENTION

The Applicant has thus considered the possibility of manufacturing much simpler and cheaper bottom structures for VSP packages by moving the EZO feature from the bottom to the top web. In such a way, the bottom web, in addition to optional sealability and barrier performance, should only provide for support functions thus allowing a significant structural simplification.

However, there were technical problems and believes that discouraged the incorporation of the EZO frangible blend in the top web of VSP packages.

First of all, it was believed that—if the EZO frangible blend had been incorporated in the top web instead of in the bottom web—there would have been an improper propagation of the fracture at opening with a much higher risk of encapsulation.

Encapsulation is a drawback of known EZO bottom web systems based on cohesive failure, which may occur when, at opening, the propagation of the fracture is not as expected.

In fact, upon applying a pulling force, the breakage does not run from the EZO frangible blend layer through the sealant layer up to the product thus effectively opening the package (see the sketch for a correct opening of FIGS. 1a and 1b in which for the combined effect of the opening force I and the product weight III the seal layer breaks as shown by arrow II). Rather, the fracture proceeds within the EZO frangible blend layer, with delamination of part of the bottom web, thus leaving the product encapsulated between the top web and the sealant layer of the bottom web (see the sketch of FIG. 2). It is clear that encapsulation is a serious problem as, at the end, results in a package still closed that forces the final user to resort to scissors or other cutting means.

FIG. 2 illustrates the phenomenon of encapsulation of a prior art VSP package having the EZO frangible blend in the bottom upon applying a pulling force.

If the EZO frangible blend were part of the top web, encapsulation would be even more favored because of the direction of the forces applied during the pack opening which promotes delamination of the top web (see FIG. 4 which illustrates encapsulation for a VSP package with the EZO frangible blend in the top web). Furthermore, the weight of the product helps the correct opening if the EZO system is placed in the bottom web (see the drawing of FIG. 1b where the weight effect is represented with arrows III directed downwards) while it would be useless in case the EZO frangible blend were placed in the top web.

In brief, in packages having the easy-to open layer within the bottom web, the product pressing onto the bottom structure favors the propagation of the fracture up to the product without delamination, thus preventing encapsulation.

Additionally, it was believed that a VSP package—in which the EZO cohesive failure blend were incorporated in the top web—had a higher risk to experience a difficult opening and a wrong fracture propagation because top webs for VSP applications are typically subjected to cross-linking.

Cross-linking—conventionally performed on top films to confer the required exceptionally high implosion, thermal and abuse resistance—was considered to be incompatible with the very working mechanism of the cohesive failure EZO frangible blends.

In fact, cohesive failure through EZO frangible blends layer is based on the scarce affinity of a first polymer with the other polymer(s) of the blend, which results in inhomogeneity and internal weakness of the layer. This inhomogeneity of the blend was considered to be responsible for failure of the layer and propagation of the tear.

On the other hand, cross-linking of the layer including the EZO frangible blend was believed to prevent the cohesive failure and impair the opening of the package because cross-linking strengthens the EZO layer adding new bonds within the matrix.

However, the Applicant has unexpectedly found that it is possible to achieve very good opening performance, in cross-linked top webs for VSP packages comprising cohesive failure blends without encapsulation. On pulling the top web at a corner, opening proceeds smoothly within the blend even if the blend was cross-linked. Surprisingly, the opening performance is more reliable and consistent than that of previous VSP packages incorporating the EZO frangible blends in the bottom web.

Once the tear reaches the sealant layer it breaks it up to the product thus opening the package, notwithstanding the weight of the product would favor the delamination of the top layers and notwithstanding the EZO layer was cross-linked.

It is thus a first object of the present invention a cross-linked thermoplastic multilayer film for use as a top web in VSP applications comprising at least an heat-sealable outer layer (a), a layer (b) directly adhered to the layer (a) or adhered to the layer (a) with the interposition of a layer (a'), and, optionally, a thermoplastic layer (c) adjacent and directly bonded to layer (b), wherein the layer (a) and/or the layer (a') if present and/or the layer (b) comprise a cross-linked EZO frangible blend (B) of at least two chemically or physically incompatible polymers.

A second object of the present invention is an easy-to-open VSP package comprising:

a cross-linked top film according to the first object, a support and a product loaded onto said support said film being draped over the product and sealed to the entire surface of the support not covered by the product.

A third object of the present invention is a vacuum skin packaging process for manufacturing an easy-to-open VSP package in which the top film is a film according to the first object.

In particular, a third object of the present invention is a vacuum skin packaging process for manufacturing an easy-to-open VSP package, comprising providing a cross-linked top film according to the first object, comprising an outer layer (a), providing a support, disposing the film over the support, with the outer layer (a) facing the support, disposing a product between the top film and the support, heating the top film and moulding it down upon and around the product and against the support, the space between the heated top film and the support having been evacuated to form a tight skin around the product, and tight sealing said top film to the entire surface of the support not covered by the product by differential air pressure.

A fourth object of the present invention is the use of a film according to the first object as top web in easy-to-open VSP packages.

Definitions

As used herein, the term "film" is used in a generic sense to include plastic web, regardless of whether it is film or sheet.

As used herein, the terms "top film" or "top web" are used referring to the film which according to a conventional VSP packaging process is heated into the dome of the VSP equipment.

As used herein, the terms "vacuum skin packaging" or "VSP" indicate that the product is packaged under vacuum and the space containing the product is evacuated from gases at the moment of packaging. The top flexible film, which is draped over the product as a skin, is referred to as "top film" or "top web".

As used herein, the phrase "a film for use as a top web in VSP applications" refers to a thermoplastic film which is suitable for use in a VSP process, namely a film able to stand heating and stretching conditions within the vacuum chamber of the packaging machine without undergoing perforations and excessive softening and, afterwards, able to tight adhering to the entire surface of the support. Preferably, a film for use as a top web in VSP applications is characterized by high implosion resistance, formability and sealability as defined and evaluated according to the present description.

As used herein, the term "VSP package" refers to a vacuum skin package, comprising a top film, a support and a product, wherein the top film is heated, molded down upon and around the product and against the support, the space between the heated upper film and the support having been evacuated. The upper heated web forms a tight skin around the product and is sealed to the entire surface of the support not covered by the product, by differential air pressure.

As used herein, the term "homopolymer" refers to a polymer resulting from the polymerization of a single monomer, i.e., a polymer consisting essentially of a single type of repeating unit.

As used herein, the term "copolymer" refers to polymers formed by the polymerization reaction of at least two different monomers.

As used herein, the term "polyolefin" refers to any polymerized olefin, which can be linear, branched, cyclic, aliphatic, aromatic, substituted or unsubstituted. More specifically, included in the term "polyolefin" are homopolymers of olefin, copolymers of olefins, copolymers of an olefin and a non-olefin comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene-vinyl acetate copolymer (EVA), ethylene unsaturated ester copolymer and ethylene unsaturated acid copolymer [especially ethylene/butyl acrylate copolymer, ethylene/methyl acrylate, ethylene-acrylic acid copolymer (EAA), ethylene/methacrylic acid copolymer (EMAA), modified polyolefin resins, ionomer resins, polymethylpentene, etc.

As used herein, the term "ethylene-alpha-olefin copolymer" and "ethylene/alpha olefin copolymer", refer to such heterogeneous materials as linear low density polyethylene (LLDPE), and very low and ultra low density polyethylene (VLDPE and ULDPE); and homogeneous polymers such as metallocene-catalyzed EXACT™ linear homogeneous ethylene/alpha olefin copolymers resins obtainable from Exxon Chemical Company and TAFMER™ linear homogeneous ethylene-alpha olefin copolymer resins obtainable from Mitsui Petrochemical Corporation. All these materials generally include copolymers of ethylene with one or more comonomers selected from C4 to C10 alpha-olefins such as butene-1 (i.e., 1-butene), hexene-1, octene-1, etc. in which the molecules of the copolymers comprise long chains with relatively few side chain branches or cross-linked structure. This molecular structure is to be contrasted with conventional low or medium density polyethylenes, which are more highly branched than their respective counterparts. The heterogeneous ethylene/alpha-olefin commonly known as LLDPE has a density usually in the range of from about 0.91 g/cm3 to about 0.94 g/cm3. Other ethylene/alpha olefin copolymers such as the long chain branched homogeneous ethylene/alpha olefin copolymers available from the Dow Chemical Company, known as AFFINITY™ resins, are also included as another type of homogeneous ethylene-alpha olefin copolymer.

As used herein, the phrase "directly adhered" or "directly adhering", as applied to film layers, is defined as adhesion of the subject film layer to the object film layer, without a tie layer, adhesive, or other layer there between.

As used herein "contiguous", when referred to two layers, is intended to refer to two layers that are directly adhered one to the other. In contrast, as used herein, the word "between", as applied to a film layer expressed as being between two other specified layers, includes both direct adherence of the subject layer to the two other layers it is between, as well as lack of direct adherence to either or both of the two other layers the subject layer is between, i.e., one or more additional layers can be imposed between the subject layer and one or more of the layers the subject layer is between.

As used herein, the term "extrusion" is used with reference to the process of forming continuous shapes by forcing a molten plastic material through a die, followed by cooling. Immediately prior to extrusion through the die, the relatively high viscosity polymeric material is fed into a rotating screw of variable pitch, i.e., an extruder, which forces the polymeric material through the die.

As used herein, the term "coextrusion" refers to the process of extruding two or more materials through a single die fed by two or more extruders arranged so that the extrudates merge and weld together into a laminar structure before chilling, i.e. quenching.

As used herein, the term "not heat-shrinkable" refers to a film characterized by a total free shrink percentage (i.e. the sum of free shrink percentage in LD and TD directions) measured in oil at 160° C. according to D2732 method lower than 20% or 15%, preferably lower than 10%.

As used herein, the terms "outer layer" or "skin layer" or "abuse layer" refer to a film layer different from the seal layer having only one of its principal surfaces directly adhered to another layer of the film. In particular, the "abuse layer" is the outer layer that in the VSP packaging process get in contact with the heated dome.

As used herein, the phrase "inner layer" refers to any layer having both its surfaces directly adhered to another layer of the film.

As used herein, the term "core", and the phrase "core layer" refer to any inner layer, which has a primary function other than serving as an adhesive or compatibilizer for adhering two layers to one another.

As used herein, the phrase "tie layer" refers to any inner layer having the primary purpose of adhering two layers to one another.

As used herein, the phrase "bulk layer" refers to any inner layer having the primary purpose to improve the mechanical properties, such as abuse or puncture resistance.

As used herein, the phrases "seal layer", "sealing layer", "heat-seal layer", and "sealant layer", refer to an outer film layer involved in the sealing of the film to itself, to another film layer of the same or another film and/or another article which is not a film. In particular, "sealing layer" or "sealant layer" is the outer layer of the multi-layer film that in the VSP packaging process will be in contact with the food product and will seal to the support.

As used herein, the term "seal" refers to any seal of a first region of a film surface to a second region of a film surface or another article surface, wherein the seal is formed by heating at least the first region to its respective seal initiation temperature. The seal is based on the bond formed by the melted material(s). The heating can be performed by anyone or more of a wide variety of manners, such as using a heated bar, hot air, infrared radiation, or other means able to transfer heat by conduction, convection or radiation.

As used herein the term "adhesion" or "adhesible" broadly refer to the possibility of a surface, material, layer, film etc. to adhere to the same or a second surface, material, layer, film by welding or melting, namely by sealing, but also, at least partially, by chemical affinity or other mechanisms, such as for instance by sticking.

As used herein the term "barrier layer" refers to a water barrier, gas barrier or, preferably, to an oxygen-barrier layer and it is used to identify layers or structures characterized by an Oxygen Transmission Rate (evaluated at 23° C. and 0% R.H. according to ASTM D-3985) of less than 500 cm$^3$ m$^2$.day.atm. Suitable thermoplastic materials that would provide such gas-barrier properties are PVDC, polyamides, EVOH, polyesters, and blends thereof, preferably EVOH.

As used herein, the term "EVOH" includes saponified or hydrolyzed ethylene-vinyl acetate copolymers, and refers to vinyl alcohol copolymers having an ethylene comonomer content preferably comprised from about 25 to about 48 mole %, more preferably, from about 32 to about 48 mole % ethylene, and even more preferably, from about 38 to about 44 mole % ethylene, and a saponification degree of at least 85%, preferably at least 90%.

As used herein, "PVDC" is any vinylidene chloride copolymer wherein a major amount of the copolymer comprises vinylidene chloride and a minor amount of the copolymer comprises one or more unsaturated monomers copolymerisable therewith, typically vinyl chloride, and alkyl acrylates or methacrylates (e.g. methyl acrylate or methacrylate) and the blends thereof in different proportions. Generally, a PVDC barrier layer will contain plasticisers and/or stabilizers as known in the art.

As used herein, the term "polyamides" includes aliphatic homo- or co-polyamides commonly referred to as e.g. polyamide 6, polyamide 69, polyamide 610, polyamide 612, polyamide 11, polyamide 12, polyamide 6/12, polyamide 6/66, polyamide 66/610, modifications thereof and blends thereof. Said term also includes crystalline or partially crystalline, aromatic or partially aromatic, polyamides, such as polyamide 61/6T or polyamide MXD6.

As used herein, the phrase "styrene-based polymer" refers to at least one polymer selected from the group consisting of polystyrene, styrene-ethylene-butylene-styrene copolymer, styrene-butadiene-styrene copolymer, styrene-isoprene-styrene copolymer, styrene-ethylene-butadiene-styrene copolymer, and styrene-(ethylene-propylene rubber)-styrene copolymer. As used herein the use of a "dash" (i.e., the "-") in a styrene-based polymer formula, is inclusive of both block copolymers and random copolymers. More particularly, the phrase "styrene-based polymer" includes both copolymers in which (i) all named monomers are present as a block, or (ii) any subset of the named monomers are present as a block with the remaining monomers being randomly arranged, or (iii) all named monomers are randomly arranged.

The term "polystyrene" as used herein refers to film grade homopolymers and copolymers of styrene and its analogs and homologs, including -methyl-styrene and ring-substituted styrenes, such as for instance ring-methylated styrenes. This term "polystyrene polymer" is used to identify single polymers or blends of different polystyrene polymers as indicated above.

As used herein, the phrase "cohesive failure" refers to any system where the easy opening feature is achieved by internal rupture of a layer, which during opening of the package breaks internally along a plane parallel to the layer itself.

As used herein, the terms "compatible or incompatible" when referred to polymers mean miscible or immiscible polymers, namely to polymers that when admixed do not result in a single phase.

As used herein, the phrase "chemically or physically incompatible polymers" refers to immiscible resins which when admixed do not result in a single phase or homogeneous system because of low chemical affinity—due for instance to the different polarity of the monomers—and/or low physical affinity—due for instance to different morphology of the two material in their solid state—of the resins.

Immiscible polymers, when blended or melted together, result in a system of (at least) two phases, which are generally observable under electron microscope, wherein the minority polymer(s) remains dispersed, e.g. in the form of islet or droplets, within the matrix of the majority polymer(s).

The scarce reciprocal affinity of immiscible polymers in a blend is the very reason for the failure of the layer comprising said frangible blend when contrasting forces are applied to it.

As used herein, the phrases "opening strength" or "opening force" refer to the force required to open the package according to the method described in the experimental section of the present description.

As used herein the terms "easy-to-open", "easy opening" or "EZO" when referred to a blend or to a layer refer to a frangible blend or a frangible layer comprising a blend of incompatible or immiscible polymers which easily fail when contrary forces are applied to.

As used herein, the term "easy opening package" means a package showing an opening force, measured by using the method described herein of from 150 to 900 g/2.54 cm, preferably 200 to 800 g/2.54 cm, even more preferably 250 to 600 g/2.54 cm.

As used herein the term "support" means the bottom part of the VSP package into which the product is accommodated and onto which the top skin film is draped for the part that is not covered by the product. The support can be flat or shaped, i.e. tray-shaped, flexible, rigid or semi-rigid. The support may be a bottom in-line thermoformed support or an off-line pre-made tray.

As used herein, the phrase "differential air pressure" refers to the difference between the pressure applied outside the package (e.g. atmospheric pressure) versus the pressure inside the package (vacuum).

As used herein, the term "Protocol P1" refers to a standard VSP packaging process and equipment, wherein the support is thermoformed in line from a thermoplastic bottom web unwind from a roll (Rollstock). The equipment (for instance Multivac R570CD) performs sealing of the top web, thermoforming, optionally perforation, of the support, and cutting of the package as well. In line thermoforming of the support in a VSP packaging process is described, for instance in WO200901019 or WO2007137804.

As used herein, the term "Protocol P2" refers to a standard VSP packaging process named "tray skin" performed on classical VSP equipment (for instance Multivac T200) wherein the support is a pre-formed, optionally perforated, flat or shallow tray. Exemplary VSP packages and their conventional manufacturing processes are those disclosed for instance in FR1258357, FR1286018, AU3491504, USRE30009, U.S. Pat. Nos. 3,574,642, 3,681,092, 3,713, 849, 4,055,672 and 5,346,735. As used herein, the term "Protocol P3" refers to a VSP process wherein the support is perforated, before or within the sealing station, to improve the phase of extraction of gas from the package (vacuumization). Examples of VSP packages manufactured according to this protocol may be found for instance in WO2009141214, WO2011/012652 and WO2014/060507 in the name of Cryovac.

As used herein the terms "machine direction", herein abbreviated "MD," and "longitudinal direction", herein abbreviated "LD", refer to a direction "along the length" of the film, i.e., in the direction of the extrusion of the film. When referred to packages, they relate to their motion direction in the packaging equipment.

As used herein, the terms "transverse direction", herein abbreviated "TD", and "crosswise direction" refer to a direction across the film, perpendicular to the machine or longitudinal direction. When referred to packages, they relate to a direction perpendicular to their motion direction in the packaging equipment.

As used herein the term "microwavable" when used in connection with the films or the VSP packages of the present invention, refers to those structures that are "substantially microwave transparent" as well as those that are "microwave active". While substantially microwave-transparent are those capable of being crossed by at least 80%, preferably at least 90% of the microwaves generated by a microwave oven without any sort of interference therewith, the microwave-active are those that incorporate microwave reflective components intended to modify the energy deposition within the adjacent foodstuff. To be "microwavable" in both cases, under the conditions of use, the packaging material should not be degraded or deformed and it should not release more than 60 ppm of global contaminants to the packaged food in contact therewith. In practice, packaging materials that withstand a heat treatment at 121° C. for 30 min (conditions that are drastic enough not to be reached normally in microwave cooking) without deforming and releasing less than 60 ppm of contaminants, are considered to be "microwavable" according to most of the food laws.

As used herein, the term "gel content" refers to the content of gel-like material in a part of or in the whole thermoplastic film, formed because of cross-linking within the polymeric material. Gel content is expressed as a relative percent (by weight) of the polymer which -having formed insoluble carbon-carbon bonds between polymer chains due to cross-linking—is in a gel form. Gel content may be determined by ASTM D-2765-01 Test Method, which is incorporated herein by reference in its entirety or by the method described in the present experimental section.

BRIEF DESCRIPTION OF DRAWINGS

FIGS. 7A and 7B show the sealing defects that may occur in a VSP packaging cycle, their denomination and score in the present formability test.

FIG. 8 is a top view of the block used in the present implosion resistance test. The drawing is on scale, namely the proportion of the parts are kept, and the measures of the holes reported therein are the real dimensions in mm.

DETAILED DESCRIPTION OF THE INVENTION

Figure 1A:
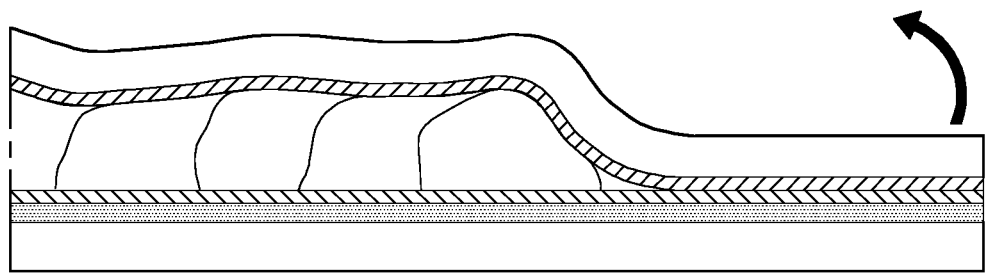
FIGS. 1a and 1b are cross views of a closed and opened VSP package of the prior art—in which the EZO frangible blend is in a layer directly adhered to the sealing layer of the bottom web—showing the correct opening of the package according to the cohesive failure mechanism.
Figure 1B:
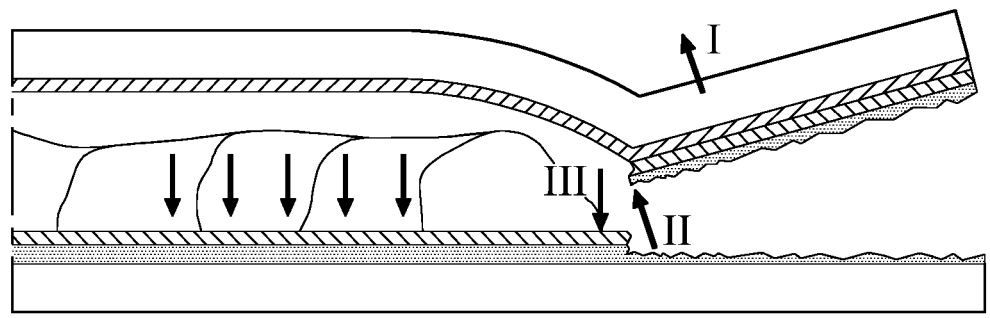
Figure 2A:
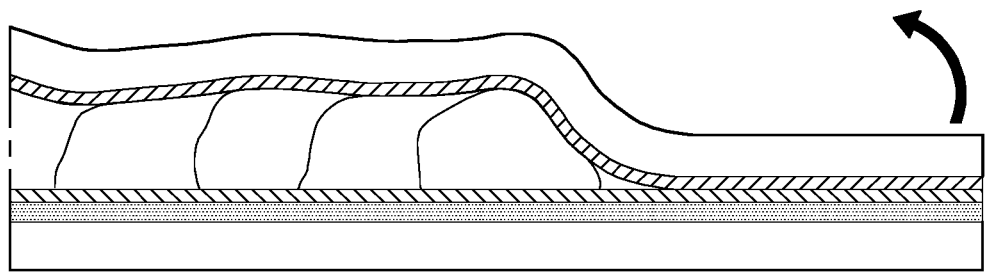
FIG. 2 shows the wrong opening with product encapsulation of the prior art VSP package of FIG. 1.
Figure 2B:
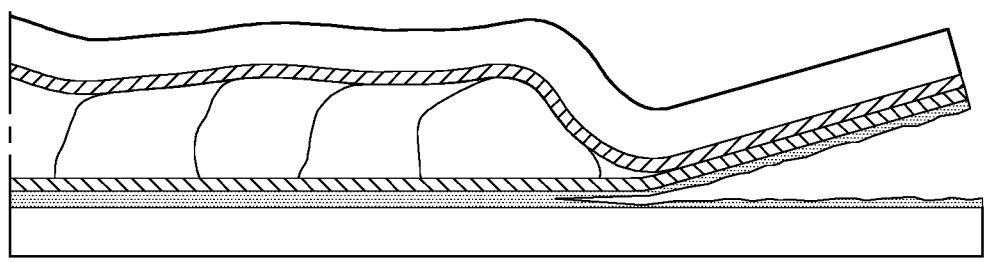

While the invention will be described in connection with one or more preferred embodiments, it will be understood that it is not limited to these embodiments. On the contrary, the invention includes all alternatives, modifications, and equivalents as may be included within the scope of the appended claims.

The percentages are percentages by weight unless otherwise stated.

A first object of the present invention is a cross-linked thermoplastic multilayer film for use as a top web in VSP applications comprising at least
an outer heat sealable layer (a),
a layer (b) directly adhered to the layer (a) or adhered to the layer (a) with the interposition of a layer (a') and, optionally,
a thermoplastic layer (c) adjacent and directly bonded to layer (b),
wherein the layer (a) and/or the layer (a') if present and/or the layer (b) comprise a cross-linked EZO frangible blend (B) of at least two chemically or physically incompatible polymers.

The films of the present invention comprises an outer layer (a).

The outer layer (a) of the present films is a heat sealable, optionally adhesible layer.

Preferably, the film is heat sealable and layer (a) is a sealable layer.

In case of a sealable layer, it comprises polymers generally used for this purpose in the art of VSP films, typically polyolefins characterized by low Tg values. Suitable polymers for the heat-sealable layer may be ethylene homo- or co-polymers, like LLDPE, LDPE, VLDPE, polypropylenes, ethylene/alpha-olefin copolymers, ethylene/acrylic acid copolymers, ethylene/methacrylic acid copolymers, or ethylene/vinyl acetate copolymers, ionomers and their blends.

Preferred materials for the heat-sealable layer are VLDPE, LLDPE, LDPE, ionomers, ethylene-vinyl acetate copolymers, ethylene-propylene copolymers and blends thereof.

Examples of suitable resins for the outer layer (a) are ethylene-propylene copolymer VERSIFY 3000 (DOW), ethylene-vinyl acetate copolymer ESCORENE ULTRA FL00909 (Exxon Mobil), low-density polyethylene such as LD259 or LD158BW (Exxon Mobil), very low density polyethylene QUEO 2M131 Borealis. Preferably, layer (a) comprises at least 50%, 60%, 70%, 80%, 90%, 95% by weight with respect to the layer (a) weight of one or more of the above polymers, more preferably consists of one or more of the above polymers.

In addition to the sealing properties, layer (a) may have adhesive properties.

In fact, as the adhesion of the top web to the support may, at least partially, be based on sticking of the two surfaces and not only on welding, also polymers which are commonly considered to be scarcely sealable but having a sufficient stickiness with respect to the support may be used as additional or only components of layer (a) as well.

In case of an adhesible layer (a), it may comprise for instance EVATANE® 2803 by Arkema, Escorene™ FL 00226 by ExxonMobil, Bynel® 1123 by DuPont optionally in admixture with one or more of the sealable polymers listed above.

In this respect, for a correct opening of the present VSP package by cohesive failure, it is sufficient that the weakest part of the package is/are the layer(s) comprising the EZO frangible blend (B) in the top web. In other words, a smooth opening is expected provided that the force required to rupture internally the EZO frangible blend (B) layer is lower than the adhesion force, which keeps adhered top and bottom webs.

Depending on the nature of the support, the person skilled in the art will be able to select the best components for the layer (a) of the present top web in order to get an adhesion sufficiently high, by balancing welding and possibly sticking properties.

In alternative, the layer (a) comprises the EZO frangible blend (B).

In such a case, layer (a) comprises at least 50%, 60%, 70%, 80%, 90%, 95% by weight with respect to the layer (a) weight of the EZO frangible blend (B), more preferably consists of the EZO frangible blend (B).

The present film may comprise a layer b) directly adhered to the layer (a)

Preferably, the present film comprises a layer b) directly adhered to the layer (a).

In case layer (a) is the only layer comprising the EZO frangible blend (B), layer b) preferably comprises one or more of the polymers used in the bulk layer (f), more preferably it consists of one or more of said polymers.

Preferably, only layer (b) comprises the EZO frangible blend (B), said blend in amount higher than 50%, 60%, 70%, 80%, 90% by weight with respect to the layer (b) weight or layer (b) consists of the EZO frangible blend (B).

In alternative, both layers (a) and (b) may comprise the EZO frangible blend (B), in amount independently higher than 50%, 60%, 70%, 80%, 90% by weight with respect to each layer weight or they both consist of the EZO frangible blend (B).

The present film may comprise an additional layer (a') interposed between layer (a) and layer (b).

Layer (a') may comprise the EZO frangible blend (B) or one or more of the polymers used in the layer (a) or in the bulk layer (f), as herein defined.

Preferably layer (a') comprises at least 50%, 60%, 70%, 80%, 90%, 95% by weight with respect to the layer (a') weight of the EZO frangible blend (B) or of one or more of the polymers used in the layer (a) or in the bulk layer (f), more preferably consists of the EZO frangible blend (B) or of one or more of the polymers used in the layer (a) or in the bulk layer (f).

The present film may comprise the EZO frangible blend (B) in layer (a), in layer (a') if present, and in layer (b).

The present film may comprise the EZO frangible blend (B) only in layer (a), only in layer (a'), if present, or only in layer (b).

Preferably, the present film comprises the EZO frangible blend (B) only in layer (b).

More preferably, layer (b) is the only layer of the film comprising the EZO frangible blend (B) and it consists of the EZO frangible blend (B).

The present film preferably does not comprise layer (a').

Preferably, the layer (a) has a thickness from 1 to 10 microns, more preferably from 1 to 5 microns, even more preferably from 1 to 3 microns. The Applicant has found that, when the EZO frangible blend (B) is present in the inner layer (b) only, a very thin layer (a) is advantageous in that, upon opening, it favors the correct propagation of the fracture and prevents delamination and encapsulation of the product.

Layer (a'), if present, may have a thickness from 1 to 10 microns, preferably from 1 to 5 microns, more preferably from 1 to 3 microns.

In case layer (b) is the only layer comprising the EZO frangible blend (B) and layer (a') is present, the total thickness of layers (a) and (a') is preferably not higher than 10 microns, more preferably not higher than 5 microns, even more preferably not higher than 3 microns.

The Applicant has observed that at opening of the package, the propagation of the fracture from the EZO containing layer (b) to the product is smooth if the thickness of the interposed layers is low.

Preferably, layer (b) has a thickness in the range of from 2 to 30 microns, more preferably from 4 to 20 microns or more preferably from 4 to 10 microns.

The film of the present invention comprises at least one layer comprising the EZO frangible blend (B). The EZO frangible blend (B) comprises at least two chemically or physically incompatible polymers, as previously defined.

EZO frangible blends (B) comprising chemically and/or physically incompatible polymers are preferably binary or ternary blends.

In one embodiment, the EZO frangible blend (B) is a binary blend comprising, preferably consisting of:

(i) an ethylene and acrylic acid or methacrylic acid copolymer and (ii) a modified EVA copolymer, or (i) an ethylene and acrylic acid or methacrylic acid copolymer and (iii) a polybutylene, or (ii) an ethylene homo or copolymer or an EVA copolymer and (iii) a polybutylene. Preferably, the EZO frangible binary blend (B) consists of:

(i) more than 50% of an ethylene and acrylic acid or methacrylic acid copolymer and (ii) the complement to 100% of a modified EVA copolymer, or (i) more than 50% of an ethylene and acrylic acid or methacrylic acid copolymer and (iii) the complement to 100% of a polybutylene, or (ii) more than 50% of an ethylene homo or copolymer or an EVA copolymer and (iii) the complement to 100% of a polybutylene.

In a preferred embodiment, the EZO frangible binary blend (B) comprises or preferably consists of (i) a copolymer of ethylene and acrylic acid or methacrylic acid, and (ii) a modified EVA copolymer.

Preferably, said EZO frangible binary blend comprises (i) an ionomer having a melt flow index of less than 5, and (ii) a modified ethylene/vinyl acetate copolymer having a substantially higher melt flow index, whereby the melt flow indexes of the two polymers in the seal layer differ by at least 10.

Preferably, said binary blend comprises at least 60% by weight of (i) an ionomer having a melt flow index of less than 5, and at most 40% by weight of (ii) a modified ethylene/vinyl acetate copolymer having a substantially higher melt flow index, whereby the melt flow indexes of the two polymers in the seal layer differ by at least 10, with respect to the blend weight.

Suitable EZO frangible binary blends (B) of this kind are described for instance in EP192131 (Grace). In another preferred embodiment, the EZO frangible binary blend (B) comprises or preferably consists of
(ii) an ethylene homo- or copolymer and
(iii) a polybutylene.

Said EZO frangible binary blend comprise a major proportion (namely more than 50% by weight, preferably more than 60% or more preferably more than 70% by weight) of (ii) an ethylene homo- or copolymer and a minor proportion (namely less than 50%, preferably less than 40%, more preferably less than 30% by weight) of (iii) a polybutylene, with respect to the blend weight.

Suitable EZO frangible binary blends (B) of this kind are described for instance in EP1749655 (Bemis). In another embodiment, the EZO frangible binary blend (B) comprises or preferably consists of
(i) an ionomer and
(iii) a polybutylene.

Said EZO frangible binary blend comprise a major proportion (namely more than 50% by weight, preferably more than 60% or more preferably more than 70% by weight) of (ii) an ionomer and a minor proportion (namely less than 50%, preferably less than 40%, more preferably less than 30% by weight) of (iii) a polybutylene, with respect to the blend weight.

Suitable binary blends (B) of this kind are described for instance in EP1749655 (Bemis). In another embodiment, the EZO frangible binary blend (B) comprises or preferably consists of
(ii) an EVA and
(iii) a polybutylene.

Said EZO frangible binary blend comprise a major proportion (namely more than 50% by weight, preferably more than 60% or more preferably more than 70% by weight) of (ii) an ethylene vinyl acetate copolymer and a minor proportion (namely less than 50%, preferably less than 40%, more preferably less than 30% by weight) of (iii) a polybutylene, with respect to the blend weight.

Most preferably, said EZO frangible binary blend comprises 85% of (ii) an EVA and 15% of (iii) a polybutylene by weight with respect to the blend weight. Suitable EZO frangible binary blends (B) of this kind are described for instance in EP1749655 (Bemis).

In another embodiment, the EZO frangible binary blend (B) comprises or preferably consists of
(i) a copolymer of ethylene and acrylic acid or methacrylic acid, and
(iii) a polybutylene.

Said EZO frangible binary blend comprise a major proportion (namely more than 50% by weight, preferably more than 60% or more preferably more than 70% by weight) of (ii) an ethylene homo- or copolymer and a minor proportion (namely less than 50%, preferably less than 40%, more preferably less than 30% by weight) of (iii) a polybutylene, with respect to the blend weight Suitable EZO frangible binary blends (B) of this kind are described for instance in EP1749655 (Bemis). The EZO frangible blend (B) may further comprise a third component (ternary blends).

A preferred EZO frangible ternary blend (B) comprises or preferably consists of
(i) a copolymer of ethylene and acrylic acid or methacrylic acid,
(ii) a modified EVA copolymer, and
(iii) a polybutylene.

Suitable EZO frangible ternary blends (B) are described for instance in WO 99/54398.

Preferably, the EZO frangible ternary blend (B) comprises or preferably consist of
(i) an ionomer, and/or
(ii) a terpolymer of ethylene, vinyl acetate and carbon monoxide, and/or
(iii) an ethylene-butene copolymer or a butene homopolymer.

In a preferred embodiment, said polymer (i) is a zinc ionomer, which provides for antiodour activity.

The Applicant found out that the incorporation of ionomers of divalent cations, especially of zinc, in inner layer(s) of VSP multilayer films, provides for unexpected good antiodour properties. In case a barrier layer is present, the antiodour containing layer is comprised between said barrier layer and the outer layer (a).

If the EZO frangible blend comprises an ionomer of a divalent cation, preferably of zinc), advantageously the film is endowed with both antiodour and EZO features.

The term "copolymer of ethylene and acrylic acid or methacrylic acid" (i) refers to a copolymer of ethylene with a copolymerisable ethylenically unsaturated carboxylic acidic monomer selected from acrylic acid and methacrylic acid. The copolymer typically contains from about 4% to about 18% by weight of acrylic or methacrylic acid units. Said copolymer can also contain, copolymerized therein, an alkyl acrylate or methacrylate, such as n-butyl acrylate or n-butyl methacrylate or isobutyl acrylate or isobutyl methacrylate. Said copolymer can be in the free acid form as well as in the ionized or partially ionized form, wherein the neutralizing cation can be any suitable metal ion, e.g. an alkali metal ion, a zinc ion, an alkali-earth metal ion or other multivalent metal ions; in this latter case, the copolymer is also termed "ionomer".

According to a preferred embodiment of the present invention, polymer (i) is an ionomer. Suitable polymers are those having a low melt flow index of less than 5 and more preferably less than 2.

Particularly suitable polymers are ionomer resins with an acid content of up to 10%. Such polymers are commercially available as Surlyn™ (by DuPont).

Examples of suitable polymers (i) are Surlyn 1601 and Surlyn 1650 (DuPont).

Particularly suitable polymer is zinc neutralized ionomer Surlyn 1650 (DuPont).

The term "modified EVA" (ii) refers to ethylene-vinyl acetate based copolymer that may be modified either by the presence of a third unit, such as CO, in the polymer chain or by admixing with or grafting thereon another modifying component.

Particularly suitable for the present invention are terpolymers obtained by copolymerization of ethylene, vinyl acetate and carbon monoxide, as those described in e.g. U.S. Pat. No. 3,780,140. Particularly preferred are those terpolymers comprising 3-30% of units deriving from carbon monoxide, 40-80% of units deriving from ethylene and 5-60% of units deriving from vinyl acetate.

Alternatively, suitable modified EVA resins include ethylene-vinyl acetate copolymers grafted with carboxylic or, preferably, anhydride functionalities, such as for instance EVA grafted with maleic anhydride.

In alternative, as polymer (ii) ethylene homo- or copolymers may be used.

In a preferred embodiment, the difference between the melt flow indexes of polymer (i) (a ionomer) and of polymer (ii) (a modified EVA copolymer) in the EZO frangible blend (B) used in the films of the present invention is at least 5 or at least 10, more preferably at least 15 and even more preferably at least 20. MFI are measured under the conditions E of ASTM D 1238.

A suitable polymer (ii) is for instance the modified EVA copolymer ELVALOY 741 (DuPont).

The term "polybutene" or "polybutylene" (iii) includes homo and copolymers consisting essentially of a butene-1, butene-2, isobutene repeating units as well as ethylene-butene copolymers. Particularly suitable for the present invention are the ethylene-butene copolymers.

Examples of suitable polymers (iii) are Polybutene-1 PB 8640M and Polybutene-1 0300M (Lyondell Basell).

Preferably, the EZO frangible blend comprises a polymer (i) which has a MFI of less than 5 g/10 min and/or
a polymer (ii) which has a MFI higher than that of polymer (i) by at least 5 g/10 min.

The EZO frangible blend (B) may be prepared by thoroughly mixing the components in powder form and then melt extruding the blend.

In a preferred embodiment, the EZO frangible blend is a ternary blend which comprises
from 35% to 83% of an ethylene and acrylic acid or methacrylic acid copolymer (i),
from 15% to 30% of a modified ethylene/vinyl acetate copolymer (ii) and
from 2% to 50% of a polybutylene (iii), with respect to the blend weight. Even more preferably, the EZO frangible ternary blend (B) comprises or most preferably consists of
from 50% to 70% of an ethylene and acrylic acid or methacrylic acid copolymer (i),
from 18% to 25% of a modified ethylene/vinyl acetate copolymer (ii) and
from 5% to 40% of a polybutylene (iii).

Most preferably, the EZO frangible ternary blend (B) comprises or most preferably consists of
from 50% to 66% of an ethylene and acrylic acid or methacrylic acid copolymer (i), preferably of an ionomer;
from 18% to 25% of a modified ethylene/vinyl acetate copolymer (ii), preferably of a terpolymer of ethylene, vinyl acetate and carbon monoxide and
from 10% to 30% of a polybutylene (iii), preferably of an ethylene-butene copolymer or a butene homopolymer.

Binary EZO frangible blends (B), made of an ethylene homo- or copolymer (ii) and a polybutylene (iii), are well known in the art of packaging and typically comprise from 60 to 90% of an ethylene homo- or copolymer and 40 to 10% of polybutylene. In the film of the present invention, the frangible blend (B) is cross-linked.

In addition to the layer (a) and the layer (b) directly adhered to the layer (a) or adhered with the interposition of layer (a'), the present film may also comprise another layer (c), adhered to the surface of the layer (b) which is not adhered to the layer (a) or (a') if present.

The additional layer (c) may be mono or multilayer.
The additionally layer (c) may comprise
(d) an outer abuse layer and/or
(e) an inner barrier layer and/or
(f) a bulk layer and, optionally,
(g) one or more inner tie layers.

Accordingly, the film may comprise e.g. one or more oxygen or vapor barrier layers (e) if the web has to be impermeable to oxygen or moisture, an outer abuse layers (d), to improve the mechanical properties of the film, one or more bulk layers (f) to provide good mechanics, and optionally tie layers (g) to make the other layers firmly adhere.

Preferably, the layer (c) of the film of the present invention comprises two bulk layers (f) and an inner gas barrier layer (e) wherein the two bulk layers (f) are positioned on the opposite sides with respect to the inner gas barrier layer (e).

The outer abuse layer (d) is the layer of the film that will be in contact with the heated dome of the vacuum chamber in the VSP process. Outer abuse layers in VSP applications typically comprise, preferably consist of, relatively high melting polyolefins, such ethylene homo-and co-polymers, propylene homo- and co-polymers, styrene-based polymers, ionomers and (co)polyesters, i.e. PET-G, and their admixtures, preferably ionomers, MDPE and HDPE, more preferably HDPE. Generally, suitable melting points are higher than 108° C., preferably higher than 120° C.

Examples of suitable resins for the outer layer (d) are RIGIDEX HD6070FA (Ineos), HDPE F0863 (SABIC) or LD158BW (Exxon Mobil).

Particularly preferred polystyrene resins are Styrolux 684D by BASF and Polystyrol 143E by BASF or "K resin KR53" by "Chevron Phillips Chemicals" which can be used either alone or in blend.

The barrier layer (e) according to the present invention comprises or consists of a polymer selected from PVDC, polyamides, EVOH, polyesters, and blends thereof, preferably comprises or consists of EVOH, optionally blended with polyamides.

Examples of suitable resins for the barrier layer (e) are SOARNOL AT4403 (Nippon Gohsei, Eval L171B (EVALCA/Kuraray), Soarnol GH3804B (Nippon Gohsei), EVAL F101B (EVALCA/Kuraray).

The thickness of the gas-barrier layer (e) will be set in order to provide the overall multi-layer sheet with the optimal Oxygen Transmission Rate (OTR), lower than 500 cm3/m2.day.atm, preferably lower than 100, more preferably lower than 10, even more preferably lower than 7, when measured at 23° C. and 0% of relative humidity (evaluated by following the method described in ASTM D-3985 and using an OX-TRAN instrument by Mocon). Preferably, EVOH is used as the only component of the barrier layer.

Typically, when EVOH is employed as the only gas-barrier material, this is generally achieved with a thickness from 3 to 20, preferably from 4 to 15, more preferably from 7 to 13 microns. Thicker layers can be used if desired or if a lower OTR is needed.

The at least one bulk layer (f) or "structural" layer, generally comprises, preferably consists of, polymers used to improve the abuse or puncture resistance of the film or just to provide the desired thickness.

Polymers suitable for these layers are typically ethylene homo- and co-polymers, e.g. low density polyethylene, ethylene-vinyl acetate copolymers, linear low density polyethylenes, linear very low density polyethylenes and ethylene-(meth)acrylates copolymers, ionomers, preferably ionomers and ethylene-vinyl acetate copolymers, more preferably ethylene-vinyl acetate copolymers.

Examples of suitable resins for the bulk layer (f) are ESCORENE ULTRA FL00119 (Exxon Mobil), ELVAX 3165 (DuPont), Surlyn 1601 (DuPont).

Preferably, the films of the present invention comprise two bulk layers (f) positioned on the opposite sides with respect to the barrier layer (e), said bulk layers comprising preferably the same polymers, more preferably ionomers or ethylene-vinyl acetate copolymers.

The thickness of the bulk layer(s) (f) in the overall structure will depend mainly on the overall thickness desired for the film. Said thickness may be expressed as a percentage of the total thickness of the present film, and it generally ranges from 30 to 80%, preferably from 35 to 70%, more preferably from 40 to 60%.

In a preferred embodiment, the film of the invention may further comprise at least one polyamide layer adhered to said barrier layer (e), preferably two polyamide layers adhered to said barrier layer (e).

Preferably, said polyamide layer does not comprise amorphous polyamides as described in details in EP2386411A1.

In a preferred embodiment, layer (c) comprises a barrier layer (e) consisting of EVOH and two polyamide layers directly adhered to the opposite surfaces of said barrier layer e), said two polyamide layers consisting of PA 6/66.

Other layers that may be optionally present in the multi-layer film of the invention are tie or adhesive layers (g) that are employed to better adhere one layer to another in the overall structure.

Tie layers may include polymers having grafted polar groups so that the polymer is capable of covalently bonding to polar polymers such as EVOH or polyamides. Useful polymers for tie layers include ethylene-unsaturated acid copolymers, ethylene-unsaturated ester copolymers, anhydride-modified polyolefins, polyurethane, and mixtures thereof. Preferred polymers, for tie layers, include one or more of thermoplastic polymers such as ethylene-vinyl acetate copolymers with high vinyl acetate content (e.g. 18-28 wt. % or even more), ethylene-(meth)acrylic acid copolymers, ethylene homo-polymers or co-polymers, modified with anhydride or carboxylic acid functionalities, blends of these resins or blends of any of the above resins with an ethylene homo- or co-polymer, and the like known resins.

Examples of suitable tie resins are OREVAC 18303 and OREVAC 18300 (Arkema).

Tie layers are of a sufficient thickness to provide the adherence function, as it is known in the art. Each tie layer may be of a substantially similar or of a different composition and/or thickness.

The film of the present invention may have any total thickness, so long as the film provides the desired properties (e.g. easy opening, formability, abuse, puncture resistance, machinability, seal strength etc.) for use as VSP top web.

In particular, the film of the present invention preferably has a total thickness of from 50 to 180 microns, preferably from 70 to 150, more preferably from 90 to 130, even more preferably from 100 to 125 microns.

Traditionally, thicker films will be used for packaging products of higher profile and/or with irregular and sharp surfaces while thinner film are sufficient and preferred in order to vacuum skin package products with a shallow profile and/or with smooth edges.

Lower thicknesses may be used in case the top film comprises one or more polyamide-based layers as those described in for instance in EP2386411A1.

One or more of any of the layers of the multilayer film of the present invention may include appropriate amounts of additives typically included in structures for VSP food packaging for the desired effect, as it is known to the person skilled in the packaging art. For instance, a layer may include additives such as slip agents, antiblock agents, antioxidants, fillers, dyes and pigments, radiation stabilizers, oxygen scavengers, antistatic agents, and the like agents.

The present films are preferably characterized by a sequence of layers selected among:

a/b, a/b/d, a/b/e/d, a/b/f, a/b/e/f, a/b/g/e/g/d, a/b/f/d, a/b/f/e/f, a/b/f/g/e/g/f/d, a/b/f/g/e/g/f/f/d, a/b/f/f/g/e/g/f/f/d, a/b/g/e/e/e/g/f/d, a/a'/b, a/a'/b/d, a/a'/b/e/d, a/a'/b/f, a/a'/b/e/f, a/a'/b/g/e/g/d, a/a'/b/f/d, a/a'/b/f/e/f, a/a'/b/f/g/e/g/f/d a/a'/b/f/g/e/g/f/f/d, a/a'/b/f/f/g/e/g/f/f/d, a/a'/b/g/e/e/e/g/f/d, a/a'/b/f/g/e/e/g/f/d in which layer (a) and/or layer (a') if present and/or layer b) comprise the EZO frangible blend (B).

Preferably, in the above sequences only layer b) comprises the EZO frangible blend (B). Preferably, layer b) consists of the EZO frangible blend (B).

Where the multi-layer film sequences represented above includes the same letter more than once, each occurrence of the letter may represent the same composition or a different composition within the class that performs a similar function.

The films of the present invention perform very well in conventional and even in more demanding VSP applications, as they are endowed with high implosion resistance, good machinability and formability. Implosion resistance is a very important property of VSP top webs in view of the harsh conditions they have to stand in the sealing—moulding step.

In fact, the demands imposed on the packaging material used in vacuum skin packaging are particularly high, especially during the heating phase in the dome and the subsequent draping over the product. Films suitable for VSP applications, for example, have to stand the heating and stretching conditions within the vacuum chamber of the packaging machine without undergoing excessive softening and perforations.

Furthermore, vacuum skin packaging of food products provided with highly irregular and sharp surfaces, like bone-in meat, crustaceans or shellfish is particularly demanding. These products are not only provided with extremely sharp and tough edges but they also have very irregular shapes which require the skin film to be highly stretched in some areas which are then more prone to puncturing The film of the present invention are further characterized by an implosion resistance of at least 8 mm, at least 10 mm, preferably at least 11 mm, even more preferably at least 12 mm, still more preferably at least 13 mm measured according to the test method described in the following experimental section. The present films show a good machinability on the common VSP equipment (i.e. regular clamping along the line, no in-line breakings etc.) and are characterized by a very satisfactory formability.

A good formability is highly desirable in VSP applications to ensure that the heated film adequately conforms to the shape of the packaged product, without leaving pleats on the package surfaces or without forming protruding areas of self-adhesion of the film, at the package corners or sides. This unwanted phenomenon, known as bridging or webbing, can be so marked to make the packages not acceptable to the consumer.

In addition to an excellent implosion resistance, the present films are endowed with a very good formability too. In the formability test reported in the experimental section, the present films are preferably characterized by a formability score for both webbing and bridging (longitudinal and transverse) of at least 2.0, preferably at least 2.5, even more preferably at least 2.8.

The present films may be manufactured by any suitable extrusion or co-extrusion process, either through a flat or a round extrusion dies, preferably by round cast or by hot blown extrusion techniques. Suitable round or flat coextrusion lines for coextruding the films of the invention are well known in the art.

Preferably, for use as the top web of a VSP package, the film of the present invention is substantially non-oriented.

The films according to the present invention are not heat-shrinkable as herein defined.

The multilayer VSP film of the invention or at least the part of it, including the EZO frangible blend (B) containing layer(s), are crosslinked. Preferably, the whole film is cross-linked.

Cross-linking is aimed at improving the strength of the film and/or helping to avoid burn through during heat seal operations and at increasing the heat resistance of the film that has to be brought in contact with the heated dome. Surprisingly, cross-linking of the top web does not alter the openability of the corresponding VSP package by cohesive failure. On the contrary, it may be responsible for a minor variability in the strength required for opening the package and, in the end, for a more reliable opening system.

The films of the present invention can be cross-linked by any chemical or low or high radiation method or combination thereof.

The preferred method of crosslinking is by electron-beam irradiation and is well known in the art. One skilled in the art can readily determine the radiation exposure level suitable for a particular application. Generally, however, radiation dosages of up to about 250 kGy are applied, typically from 80 to 240 kGy, with a preferred dosage of from 90 to 230 kGy, and a most preferred one from 110 to 220 kGy. Possible irradiation ranges suitable for the manufacture of the films of the present invention are:

from 100 to 250 kgy, from 120 to 240 kgy, from 140 to 220 kgy or from 160 to 200 kgy Irradiation is carried out conveniently at room temperature, although higher and lower temperatures, for example, from 0 to 60° C. may be employed.

Chemical cross-linking agents may also be employed to provide the necessary cross-linking of at least one of the component films of the film. Such agents are typically added to a resin directly or by means of a master batch prior to extrusion of the blend.

The multilayer VSP films of the invention or at least the part of it, including the EZO frangible blend containing layer(s), are cross-linked, to such a level that:
- the whole film in case all the polymers making the film are toluene-soluble before cross-linking or at least the part of it made of polymers which before cross-linking are toluene-soluble, may have a gel content of not less than 40%, preferably not less than 60% by weight with respect to the whole film weight or to said part of film weight, respectively, as measured in accordance with the Test Method described in the present experimental section, and/or
- the whole film has a MFI measured at 230° C., 21.6 kg, according to ASTM D-1238, which is incorporated herein by reference in its entirety, not higher than 3 g/10 min, preferably not higher than 2 g/10 min, more preferably not higher than 1 g/10 min, even more preferably of about 0 g/10 min, and/or
- the whole film has a MFI measured at 230° C., 2.16 kg, according to ASTM D-1238, which is incorporated herein by reference in its entirety, not higher than 2 g/10 min, preferably not higher than 1 g/10 min, more preferably of about 0 g/10 min.

A second object of the present invention is an easy-to-open VSP package comprising:
- a cross-linked top film according to the first object,
- a support, and
- a product loaded onto said support, said film being draped over the product and adhered to the entire surface of the support not covered by the product.

The film of the invention used in the present EZO VSP package is a sealable film and the adhesion between the sealable surface of the top film and the support is mainly provided by sealing.

However, the film of the invention may be at least partially an adhesible film and the adhesion between the adhesible surface of the top film and the support occurs at least partially by sticking or other mechanisms.

Any support or bottom web generally suitable for VSP applications may be used within the package of the present invention, including both in-line thermoformed and off-line pre-made supports.

The support may be flexible, rigid or semi-rigid, in the form of a flat sheet or of a shaped tray, bowl-shaped or cup-shaped, may be a solid or foamed polymeric tray.

In case of microwave applications, solid supports comprising a polymer with a relatively high melting point such as polypropylene, polystyrene, polyamide, 1,4-polymethyl-pentene or crystallized polyethylene terephthalate (CPET) are preferred.

Solid polypropylene is particularly preferred because of its strength, its ability to support a food product, and its relatively high melting point. Other materials will be more or less desirable for microwave applications depending on their physical characteristics such as those described above.

The support may comprise a bottom web made of a plastic web, optionally adhered or laminated to a non-plastic material.

The bottom web may be a monolayer or multilayer plastic material.

The bottom web preferably does not comprise the frangible blend.

In case of a monolayer bottom web, it may be made for instance of polypropylenes, polyesters, PVC or HDPE.

In case the monolayer bottom web surface is not sealable or adhesible, the adhesion between the top web and the bottom may be provided by tailoring the sealing and possible adhesion properties of the top web, in particular of top web outer layer (a).

In addition to, or in alternative to the above, the adhesion may be imparted through suitable treatments of the support surface known in the art such as corona treatment.

The bottom web may be a multilayer web.

Preferably, the multilayer bottom web comprises an outer sealable layer to allow a better welding of the top film to the part of the support not covered by the product. Preferably, the seal layer comprises one or more of the polymers previously listed for the top web outer layer (a), such as polyolefins, like ethylene homo- or co-polymers, propylene homo- or co-polymers, ethylene/vinyl acetate copolymers, ionomers.

The multilayer bottom web, in addition to the sealable layer generally comprises at least one bulk layer for the mechanical properties. Preferably, the bulk layer comprises one or more polymers such as polyethylene, polystyrene, polyester, poly(vinyl chloride) (PVC), polypropylene or polyamides.

In a number of applications, the bottom web is required to have gas barrier properties, in particular oxygen barrier properties.

Thus, in addition to a bulk and a heat-sealable layer, bottom web may be provided with a gas barrier layer. The thickness of the gas barrier layer will be typically set in order to provide the support with an oxygen transmission rate lower than 500 $cm^3/m^2$.day.atm, preferably lower than 100, more preferably lower than 10, even more preferably lower than 7, when measured at 23° C. and 0% of relative humidity (evaluated by following the method described in ASTM D-3985 and using an OX-TRAN instrument by Mocon).

Additional layers, such as tie layers, to better adhere the gas barrier layer to the adjacent layers, may be present in the bottom web material for the support and are preferably present depending in particular on the specific resins used for the gas barrier layer.

In case of a multilayer structure, part of it can be foamed and part can be cast.

For instance, the bottom web may comprise (from the outermost layer to the innermost food-contact layer) one or more structural layers, typically of a material such as polyethylene, polystyrene, polyester, poly(vinyl chloride), polypropylene, polyamides or cardboard; a gas barrier layer and a heat-sealable layer.

The overall thickness of the support may typically be up to 8 mm, for instance it may be comprised between 0.1 and 7 mm and more preferably between 0.2 and 6 mm.

In a preferred embodiment, the support is made of a flexible web, more preferably of a flexible web having the same composition of the top web but preferably not including any EZO layer as previously defined. Preferably, the flexible bottom web have a thickness of from 80 to 400 microns.

In a preferred embodiment, the bottom web consists of a seal layer and a bulk layer only. Preferably, the seal layer is a polyethylene base layer and the bulk layer is a polyester or polypropylene based layer.

In a preferred embodiment, the bottom web consists of a seal layer, a barrier layer and a bulk layer only. Preferably, the seal layer is a polyethylene base layer, the barrier layer is an EVOH based layer and the bulk layer is a polyester or polypropylene based layer.

The term "polyesters" refers to polymers obtained by the polycondensation reaction of dicarboxylic acids with dihydroxy alcohols. Suitable dicarboxylic acids are, for instance, terephthalic acid, isophthalic acid, 2,6-naphthalene dicarboxylic acid and the like. Suitable dihydroxy alcohols are for instance ethylene glycol, diethylene glycol, 1,4-butanediol, 1,4-cyclohexanedimethanol and the like. Examples of useful polyesters incorporated in the bottom web include poly(ethylene 2,6-naphthalate), poly(ethylene terephthalate), and copolyesters obtained by reacting one or more dicarboxylic acids with one or more dihydroxy alcohols, such as PETG which is an amorphous co-polyesters of terephthalic acid with ethylene glycol and 1,4-cyclohexanedimethanol.

The polypropylene polymers used in the present bottom webs or supports include homopolypropylene, copolypropylenes and their blends.

The bottom web comprises a seal layer and optionally one or more other layers. This or these layers may be barrier layers, bulk layers, tie layers, and an outer abuse resistance layer.

The seal layer of this web preferably comprises a polyolefin. More preferably, it comprises at least one member selected from the group comprising ethylene/alpha olefin copolymer, LLDPE, VLDPE, LDPE, MDPE, EM, EMAA, EVA, or ionomer. Even more preferably, it comprises ionomer, LLDPE, EVA or admixtures thereof.

Advantageously, as the present top web is highly engineered and incorporates most of the relevant functions, in the VSP package of the present invention the support may be particularly simple and cheap.

In a preferred embodiment, the support is made of a single sheet of non-plastic material suitably laminated or coated with at least an adhesible layer, preferably a seal layer, in order to improve the adhesion, preferably the welding, between the top web and the support.

In another embodiment, the support comprises a multi-layer plastic bottom web as described above adhered to a non-plastic material, such as for instance, a cardboard or aluminum tray.

In such a case, preferably the bottom web does not include a bulk layer, more preferably consists of a seal layer and, optionally, a barrier layer only.

In a preferred embodiment, the support includes at least one hole, in particular a pre-made or made-in line hole.

The at least one hole advantageously allows vacuuming the package more rapidly and efficiently, as detailed for instance in WO2014060507A1, WO2011/012652 and WO2014/060507 in the name of the Applicant.

Preferably, the support of the present VSP package does not include any EZO layer comprising the EZO frangible blend as previously defined, more preferably does not include any EZO system.

For microwave applications, the support will be made of substantially microwave transparent materials, such as for instance PP, PE, CPET, preferably of PP or CPET.

Examples of suitable supports for the VSP package of the invention are Pentafood Kpseal APET/PE trays, Cryovac UBRT 1520-30, UBRT1826-27 PP/liner trays (in which the liner is made of a PE seal layer and a barrier EVOH layer) or Cryovac UBST 1826-27.

Optionally the support is provided with a pre-cut made on the bottom web. This pre-cut facilitates the opening of the package by the consumer, who grasps and tears the thus formed tab and peels off the top web.

Figure 3A:
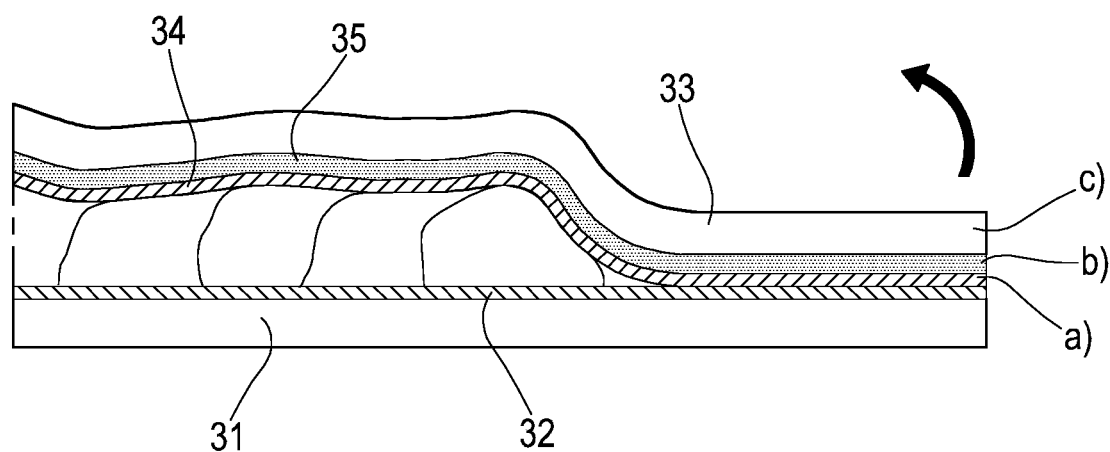
FIG. 3 shows the correct opening of a VSP package of the invention in which the EZO frangible blend is placed in the top web.
Figure 3B:
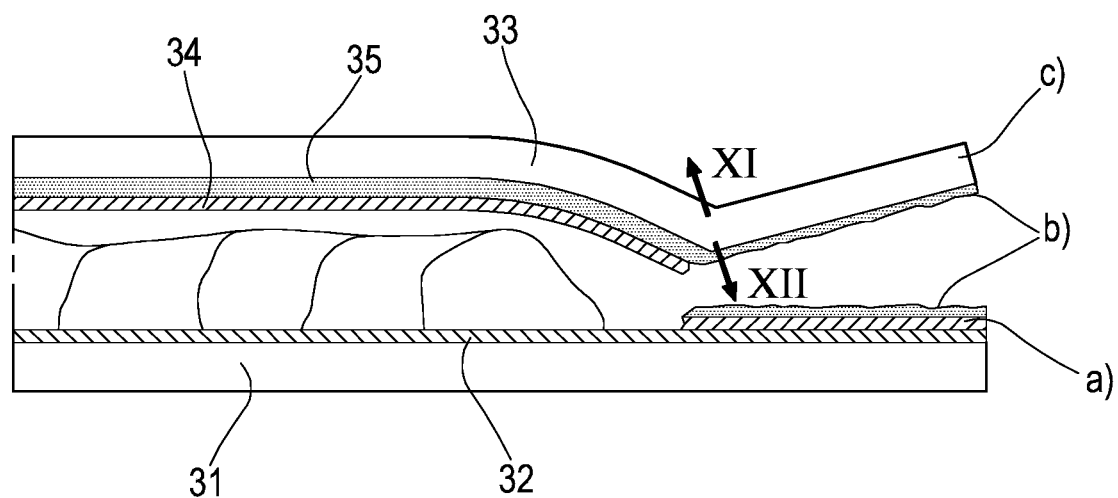
Figure 4A:
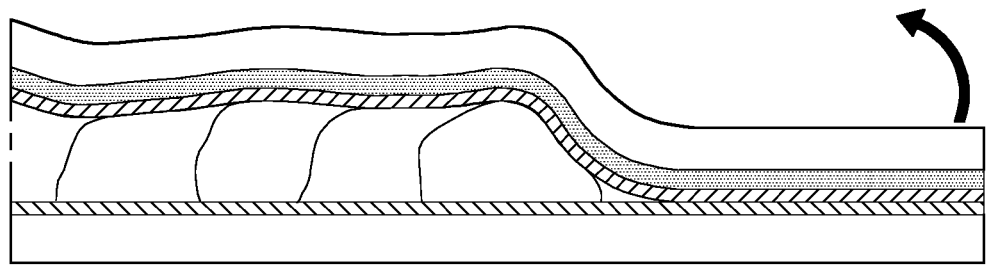
FIG. 4 shows the wrong opening with product encapsulation of the VSP package of FIG. 3.
Figure 4B:
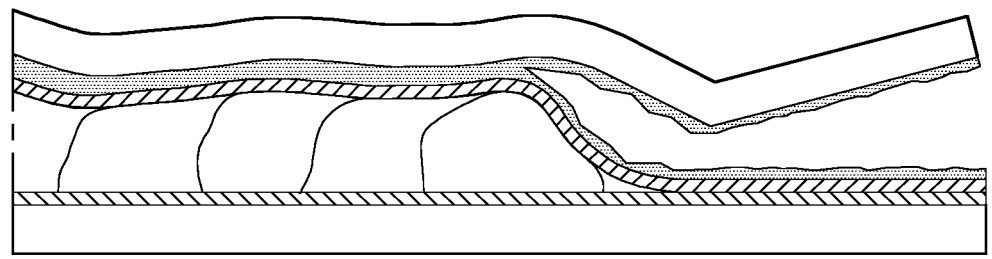

A VSP package and its easy opening mechanism according to the present invention are illustrated in FIGS. 3a and 3b (closed and open package, respectively).

This package is made of a sealable support and a top film. The sealable support is made of two layers, a substrate 31, that is a monolayer structure, thermoplastic or cardboard based, and a sealing layer 32.

The top film comprises three layers: a substrate 33 that is a monolayer thermoplastic layer (c), a sealing layer (a) 34 and an easy-to-open layer 35 (layer b) directly adhered to the sealing layer 34. The easy-to-open layer 35 comprises the EZO frangible blend (B). A possible pulling tab and a pre-cut facilitating the opening are not shown.

FIG. 3b shows the VSP package of FIG. 3a after opening. It can be appreciated that upon pulling the top web (see arrow XI) the fracture proceeded smoothly through layer (b) and then through the seal layer (a) (see arrow XII) breaking the seal layer up to the product, without fringes and unwanted layer delamination or product encapsulation.

The VSP package of the present invention comprises a product, preferably a food product such as for instance fresh red meats, processed meat, such as sausages, cheese, ready to eat or prepared meals, fish, food products provided with highly irregular and sharp surfaces, like bon-in meat, frozen products crustaceans or shellfish and the like.

Typically, the VSP package according to the invention is characterized by an average opening strength, measured according to the test reported in the description, which ranges from 600 to 150 gf/2.54 cm, preferably lower than 400, than 350, than 300, even lower than 250 gf/2.54 cm.

The force needed to open the VSP packages of the invention, in which the EZO frangible blend is in the top web is less variable than the force required for opening conventional EZO VSP packages having the cohesive failure layer(s) in the bottom web.

In a preferred embodiment, the EZO VSP package of the present invention is a microwavable EZO VSP package.

This EZO VSP package not only is suitable for the presentation and preservation of a food product, but also for use in cooking, re-heating and/or thawing the packaged food product in a microwave oven without the need for prior removal of the EZO top web or prior manual opening of the package. The present package preserve its EZO features even after cooking.

In microwaving, whether the food product is a raw or a cooked product and has to be cooked or just heated, considerable water vapor pressure is generated within the package during the heating cycle. Although cooking or heating under a slight overpressure of vapor improves the taste and texture of the end product, an excessively high overpressure within the package should be avoided to prevent sudden explosions of the package within the oven.

Advantageously the EZO VSP package of the present invention is self-venting allowing the exit of the internal vapor during the cooking cycle without impairing the final openability of the package.

Thanks to the self-venting feature, it is possible to thaw and/or cook, or re-heat the packaged product without the need of removing, loosening or perforating the top lid before putting the package into the microwave oven, without any risk of explosion, or of excessive stretching of the EZO top web. The EZO top web will in fact rise above the product, because of the pressure of the vapor released by the product (ballooning). When the vapor pressure reaches a threshold value, the package opens up and the excess vapor is vented off between the upper and lower webs of the package around the periphery of the package.

The top, when the heating is completed, will then return to its original position. After the microwaving of the package is completed, the EZO top web is easily removed.

In a preferred embodiment, the EZO VSP package of the present invention is characterized by anti-odor properties when the EZO frangible blend comprises a zinc ionomer.

A third object of the present invention is a vacuum skin packaging process for manufacturing an easy-to-open VSP package in which the top film is a film according to the first object.

In particular, a third object of the present invention is a vacuum skin packaging process for manufacturing an easy-to-open VSP package, comprising
providing a cross-linked top film according to the first object,
providing a support, in which the outer layer (a) of the top film faces the support,
disposing a product between the top film and the support,
heating the top film and moulding it down upon and around the product and against the support, the space between the heated top film and the support having been evacuated to form a tight skin around the product, and
tight adhering, preferably sealing, said top film to the entire surface of the support not covered by the product by differential air pressure.

The EZO VSP packages of the present invention may be manufacture according to any known VSP process.

The tight adhering of the top film to the entire surface of the support may be achieved by sealing, welding or sticking, preferably by heat-sealing.

The present VSP packages may be prepared for instance with a VSP conventional process, in which the packaging material comprises a pre-formed support e.g. a tray and an EZO top film according to the invention.

The product to be packaged is first placed onto the support. Then the EZO top film, generally pre-heated, and the support, bearing the product to be packaged, are separately fed to the packaging station where the EZO top film is further heated by contact with the inner surface of a so-called "dome" which is then lowered over the supported product. The space between the top and supports is evacuated and the EZO top film is allowed to come into contact with the support and with the product to be packaged. The EZO top film may be held against the dome inner surface for instance by vacuum pressure that is then released when it is desired to allow the EZO top film, sufficiently heated, to drape over the product. Sealing of the top to the support is achieved by a combination of heat from the dome and pressure difference between the inside of the package and the outside atmosphere and can be aided by mechanical pressure and/or extra-heating.

In more details, the skin-forming EZO top film of the present invention is fed to the upper section of a heated vacuum chamber comprising an upper and a lower section, and a vacuum is applied thereto from the outside, thereby drawing the skin-forming EZO top film into a concave form against the inwardly sloping walls of the upper section of the chamber and against the ports contained in the horizontal wall portion thereof (the top of the dome). Any conventional vacuum pump can be used to apply the vacuum and preferably, the skin-forming EZO top film is suitably pre-heated prior to the foregoing operation to render it more formable and thus better able to assume a concave shape in the upper section of the vacuum chamber.

The product to be packaged is positioned on a support member, that can be flat or shaped, typically tray-shaped, and placed on a platform that is carried in the vacuum chamber, in the lower section thereof, just below the dome.

Then the vacuum chamber is closed by moving the upper section down onto the lower one and during this whole sequence of operations vacuum is constantly applied to retain the concave shape of the EZO top film. Once the vacuum chamber is closed, vacuum is applied also in the lower section of the vacuum chamber in order to evacuate the space between the support member and the top skin-forming EZO top film. Vacuum in the upper section of the vacuum chamber continues to be applied to retain the concave shape of the skin-forming EZO top film until the area between the support and the skin-forming EZO top film is evacuated, then it is released and atmospheric pressure is admitted. This will collapse the softened skin-forming EZO top film over the product and the support, as the atmosphere, pushing the skin-forming EZO top film from the top, and the vacuum, pulling it from the bottom, will cooperatively work to have the skin-forming EZO top film substantially conform to the shape of the product to be packaged on the support member. Optionally, after the evacuation step has been completed, a suitably selected purging gas or gas mixture could be flushed over the product to generate a very low residual gas pressure into the package. In some instances heat-sealing bars or other sealing means can be present in the vacuum chamber to carry out a perimeter heat-seal of the skin-forming EZO top film to the support member.

This process is herein referred to as tray skin process (Protocol P2 in the present description) and may be done with conventional VSP machines such as for instance Multivac T200, Sealpac A7, Sealpac A10.

In alternative, the VSP package of the present invention may be manufactured according to a so called "rollstock" process, in which the application of the EZO top web to the support is conventional as described above but the support is thermoformed in line starting from a web from a roll. Suitable equipment are for instance Multivac R570CD, ULMA TF407, 507, 607, 707 and the like. In the present description, this manufacturing process and the machines used for are referred as Protocol P1.

In both cases, VSP package manufacturing may be done according to an improved version of the conventional VSP process, namely a high vacuum, high speed process in which the EZO top web is sealed onto perforated trays. This variant is named Darfresh on Tray. The presence of one or more holes in the trays allows for a more efficient and rapid extraction of the gas from the package and, overall, for an improved VSP cycle. The trays may be perforated before being fed or may be perforated in line, after thermoforming or just before being sealed to the top within the dome. In the present description, this improved VSP process is referred to as Protocol P3. A suitable machinery for a variant of VSP process on perforated tray is the equipment TRAVE E340, Trave 1000 Darfresh, Trave 590XL Darfresh by Mondini.

EXAMPLES

The following examples serve to further illustrate the invention, which however is not limited thereto.

The following resins were used to manufacture the top films or the bottom webs used in the present experiments:

TABLE 1

| Tradename | Supplier | Chemical Nature | Acronym/Name | Analysis | Value |
|---|---|---|---|---|---|
| SYLOBLOC 47 | GRACE Davison | Silica - Amorphous Precipitated | AntiBlock | Density | 2.1 |
|  |  |  |  | Moist. cont. | 2.0 |
|  |  |  |  | Particle sz. | 6.1 |
| Surlyn 1601 | DuPont | Sodium Neutr. ET MA Copolymer | EMAA-Na | Density | 0.940 |
|  |  |  |  | mp | 96 |
|  |  |  |  | MFR | 1.30 |
|  |  |  |  | Moist. cont. | 0.05 |
| Surlyn 1650 | DuPont | Zinc Neutr. ET MA Copolymer | EMAA-Zn | Density | 0.940 |
|  |  |  |  | Vicat SP | 73 |
|  |  |  |  | MFR | 1.50 |
|  |  |  |  | mp | 97 |
|  |  |  |  | Moist. cont. | 0.06 |
|  |  |  |  | Com. cont. | 12 |
| VERSIFY 3000 | DOW | PP, PR/ET Copolymer Single Site | EPC1 | Com. cont. | 5.2 |
|  |  |  |  | Density | 0.891 |
|  |  |  |  | MFR $^2$ | 8.0 |
|  |  |  |  | mp | 108 |
|  |  |  |  | Tg | −14 |
|  |  |  |  | Vicat SP | 105 |
| RB307MO | Borealis | PP, PR/ET Copolymer - Ziegler/Natta | EPC2 | Density | 0.902 |
|  |  |  |  | Melt Flow Rate | 1.5 |
| ADFLEX X500 F | Lyondell Basell Industries | Propylene/ Ethylene/Butene Copolymer | EPC3 | Density | 0.89 |
|  |  |  |  | MFR $^2$ | 7.5 |
|  |  |  |  | Mp | 123-163 |
|  |  |  |  | Vicat SP | 94° C. |
| ESCORENE ULTRA FL00909 | Exxon Mobil | ET/VA Copolymer. | EVA1 | Density | 0.928 |
|  |  |  |  | Com. cont. | 9.4 |
|  |  |  |  | MFR | 9 |
| ELVALOY 741 | DuPont | CO -Modified ET/VA Copolymer | EVA2 | Com. cont. | 24 |
|  |  |  |  | Density | 1 |
|  |  |  |  | mp | 66 |
| ELVAX 3165 | DuPont | ET/VA Copolymer | EVA3 | Density | 0.940 |
|  |  |  |  | MFR | 0.70 |
|  |  |  |  | Mp | 87.0 |
|  |  |  |  | Moist. Cont. | Max 0.3 |
|  |  |  |  | Vicat SP | 69.0 |
|  |  |  |  | Com. cont. | 18.00 |
| ESCORENE ULTRA FL00119 | Exxon Mobil | ET/VA Copolymer. | EVA4 | Density | 0.942 |
|  |  |  |  | mp | 85 |
|  |  |  |  | Com. cont. | 19 |
|  |  |  |  | MFR | 0.65 |
|  |  |  |  | Vicat SP | 62 |
| ELVAX 3170 | DuPont | ET/VA Copolymer | EVA5 | Density | 0.94 |
|  |  |  |  | mp | 90 |
|  |  |  |  | Com. cont. | 18 |
|  |  |  |  | MFR | 2.5 |
| PLEXAR PX1164 | Nippon Gohsei | Maleic An.-Mod. ET/VA copolymer | EVA-md1 | Density | 0.928 |
|  |  |  |  | MFR | 3.8 |
|  |  |  |  | Vicat SP | 58 |
|  |  |  |  | Com. cont | 15 |
| OREVAC 9318 | Arkema | Maleic An.-Mod. ET/VA copolymer | EVA-md2 | Density | 0.945 |
|  |  |  |  | MFR | 7 |
|  |  |  |  | mp | 85 |
|  |  |  |  | Com. cont. | 18 |
| SOARNOL AT4403 | Nippon Gohsei | Hydrolyzed ET/VA | EVOH1 | Cryst point | 144 |
|  |  |  |  | Density | 1.140 |
|  |  |  |  | mp | 164 |
|  |  |  |  | MFR | 3.5 |
|  |  |  |  | Com. cont. | 44 |

TABLE 1-continued

| Tradename | Supplier | Chemical Nature | Acronym/Name | Analysis | Value |
|---|---|---|---|---|---|
| Eval L171B | EVALCA/ Kuraray | Hydrolyzed ET/VA Copolymer, Lubricated | EVOH2 | Com. cont. Density MFR mp Cryst point Tg | 27 1.20 4.0 191 164 60 |
| Soarnol GH3804B | Nippon Gohsei | Hydrolyzed ET/VA Copolymer | EVOH3 | Com. cont. Density MFR | 44 1.15 3.8 |
| EVAL F101B | EVALCA/ Kuraray | Hydrolyzed ET/VA Copolymer | EVOH4 | Com. cont. Density mp MFR Moist. cont. Vicat SP | 32 1.196 183 1.6 0.3 173 |
| SOARNOL ET3803 | Nippon Gohsei | Hydrolyzed ET/VA Copolymer | EVOH5 | Density MFR[4] mp Com. Con. Tg Cryst point | 1.17 3.2 173 38 58 152 |
| RIGIDEX HD6070FA | Ineos | HDPE | HDPE1 | Density mp MFR | 0.96 132 7.6 |
| HDPE F0863 | SABIC | HDPE Homopolymer | HDPE2 | Density MFR mp | 0.964 8 134.00 |
| OREVAC 18303 | Arkema | Maleic An.-Mod. PE, LLD | LLDPE-md1 | Density mp Vicat SP | 0.917 124 87 |
| OREVAC 18300 | Arkema | Maleic An.-Mod. PE, LLD | LLDPE-md2 | Density MFR mp Vicat SP | 0.916 2.3 120 85 |
| AMPLIFY TY 1451 | DOW | Maleic An. - Mod. PE, LLD Blend - Rubber-Modified | LLDPE-md3 | Density MFR | 0.9080 1.40 |
| ADMER NF518E | Mitsui Chemical | Maleic Anhydride-Modified LLD PE | LLDPE-md4 | Density mp MFR | 0.91 118 3.1 |
| LD259 | Exxon Mobil | PE LD Homopolymer - Free Radical | LDPE1 | Density Mp MFR | 0.915 105 12 |
| LD158BW | Exxon Mobil | PE LD Homopolymer - Free Radical | LDPE2 | Density MFR mp | 0.925 2 110.5 |
| CESA-PROCESS PEA0050633-BN | Clariant | Fluoropolymer in PE, LD | LDPE3 | Density MFR | 0.925 2.1 |
| POLYBATCH FSU 105E | Schulman | AntiBlock and Slip in PE, LD | LDPE4 | Density Moist. cont. Ash MFR | 0.98 1.5 10 20 |
| POLYBATCH AO-25 | Schulman | PE LD | LDPE5 | Density | 0.93 |
| POLYBATCH AMF 702 | Schulman | LD Fluoropolymer in PE | LDPE6 | Density | 0.918 |
| EXCEED 4518PA | Exxon Mobil | PE, LLD ET/Hexene Copolymer Linear SS | LLDPE1 | Density MFR mp | 0.918 4.50 114 |
| CONSTAB AB 06051 LD | IMCD Italia spa | Silica in PE, LLD | LLDPE2 | Density Particle sz Ash MFR | 1.030 10 20 3.3 |
| DOWLEX SC 2108G | DOW | PE, MD ET/Octene Copol. Linear, Ziegler/Natta | MDPE | Density m.p. MFR Vicat SP | 0.935 128 2.6 118 |
| Polybutene-1 PB 8640M | Lyondell Basell | PB, Bu/ET Copolymer | PB1 | Density mp MFR | 0.906 97 1 |
| Polybutene-1 0300M | Lyondell Basell | PB, Bu Homopolymer | PB2 | Density MFR mp | 0.915 4 113-117 |

TABLE 1-continued

| Tradename | Supplier | Chemical Nature | Acronym/Name | Analysis | Value |
|---|---|---|---|---|---|
| EASTAR PETG 6763 | Eastman Chemical | Polyethylene Terephthalate/Glycol, copolyester TA 33 mol % 1,4-DCHDM 67 mol % EG | PETG | Density MFR$^3$ Intr. Viscosity Tg Vicat SP | 1.27 2.8 0.75 80 85 |
| ADMER QB 520E | Mitsui Chemical | Maleic An. -Mod. PP | PP-md | Density MFR Vicat SP m.p. | 0.9 1.8 140 161 |
| STYRON 678E | DOW | Polystyrene | PS | Density MFR$^3$ | 1.05 10.5 |
| STYROLUX 684 D | BASF | Styrene/Butadiene copol. S/B/S Triblock | SBS | Density MFR$^3$ Tg Vicat SP MFR | 1.01 11 98 83 7 |
| QUEO 2M131 | Borealis | PE, VLD ET/Octene copol. Linear SS | VLDPE1 | Density MFR | 0.902 7 |
| AFFINITY PL 1880G | DOW | PE, VLD ET/Octene Copol. - Branched, SS | VLDPE2 | Density m.p. Vicat SP MFR | 0.902 99 86 1.1 |
| NUCREL 1202 | DuPont | ET MA Copolymer | EMAA | Com. content Density mp MFR Vicat SP | 12 0.94 99 1.5 75 |

Abbreviations and keys:
Melt Flow Rate MFR;
MFR (Cond. 190° C./02.16 kg (E));
MFR $^2$ (Cond. 230° C./02.16 kg (L));
MFR $^3$ (Cond. 200° C./05.00 kg (G));
MFR $^4$ (Cond. 210° C./02.16 kg (L));
Vicat Softening point: Vicat SP;
Comonomer content: Com. cont.;
Crystallization point: Cryst point;
% comonomer: % com;
Glass transition: Tg;
Polypropylene PP;
Ethylene ET;
Polyethylene PE: Methacrylic Acid MA;
Propylene PR;
Vinyl Acetate VA;
Butene: Bu;
Maleic Anhydride: Maleic An.;
High Density: HD;
Linear Low Density: LLD;
Very Low Density: VLD;
Low Density: LD;
Medium density: MD;
Single Site: SS;
Polybutylene: PB;
Terephthalic acid TA;
dicylohexandimethanol DCHDM;
ethylene glycol EG;
Unity of measure: Density g/cm$^3$;
Melt Flow Rate g/10 min;
Moisture content: %;
Comonomer content: %;
Ash: %;
Particle size: microns;
Melting point: °C.;
Vicat Softening point: °C.;
Glass transition: °C.;
Crystallization point: °C.

Abbreviations and keys: Melt Flow Rate MFR; MFR (Cond. 190° C./02.16 kg (E); MFR$^2$ (Cond. 230° C./02.16 kg (L)); MFR$^3$ (Cond. 200° C./05.00 kg (G); MFR$^4$ (Cond. 210° C./02.16 kg (L)); Vicat Softening point: Vicat SP; Comonomer content: Corn. cont.; Crystallization point: Cryst point; % comonomer: % corn; Glass transition: Tg; Polypropylene PP; Ethylene ET; Polyethylene PE: Methacrylic Acid MA; Propylene PR; Vinyl Acetate VA; Butene: Bu; Maleic Anhydride: Maleic An.; High Density: HD; Linear Low Density: LLD; Very Low Density: VLD; Low Density: LD; Medium density: MD; Single Site: SS; Polybutylene: PB; Terephthalic acid TA; dicylohexandimethanol DCHDM; ethylene glycol EG; Unity of measure: Density g/cm$^3$; Melt Flow Rate g/10 min; Moisture content: %; Comonomer content: %; Ash: %; Particle size: microns; Melting point: ° C.; Vicat Softening point: ° C.; Glass transition: ° C.; Crystallization point: ° C.

Top Films

The top films of the invention (Ex. 1-20) and of prior art (C1-C3) reported in Tables 2 to 6, were manufactured via round cast coextrusion. The films were finally cross-linked by electron-beam irradiation at 220 Kgy unless otherwise indicated.

TABLE 2

| Layer | Ex. 1 | Ex. 2 | Ex. 3 | Ex. 4 | Ex. 5 |
|---|---|---|---|---|---|
| 1 | EVA1 99.5% AntiBlock 0.5% 2 mic | EVA1 99.5% AntiBlock 0.5% 2 mic | EVA1 99.5% AntiBlock 0.5% 2 mic | LDPE1 100% 2 mic | LDPE1 100% 2 mic |
| 2 | PB1 20% EVA2 22% EMAA-Na 58% 6 mic | PB1 20% EVA2 22% EMAA-Na 58% 6 mic | PB1 10% EVA2 24% EMAA-Na 66% 6 mic | PB1 10% EVA2 24% EMAA-Na 66% 6 mic | PB1 20% EVA2 22% EMAA-Na 58% 6 mic |
| 3 | EVA3 100% 23 mic | EVA4 100% 23 mic | EVA4 100% 23 mic | EVA4 100% 23 mic | EVA4 100% 23 mic |
| 4 | LLDPE-md1 100% 3 mic | LLDPE-md1 100% 3 mic | LLDPE-md1 100% 3 mic | LLDPE-md1 100% 3 mic | LLDPE-md1 100% 3 mic |
| 5 | EVOH1 100% 12 mic | EVOH1 100% 12 mic | EVOH1 100% 12 mic | EVOH1 100% 12 mic | EVOH1 100% 12 mic |
| 6 | LLDPE-md1 100% 3 mic | LLDPE-md1 100% 3 mic | LLDPE-md1 100% 3 mic | LLDPE-md1 100% 3 mic | LLDPE-md1 100% 3 mic |
| 7 | EVA3 100% 20.5 mic | EVA4 100% 20.5 mic | EVA4 100% 20.5 mic | EVA4 100% 20.5 mic | EVA4 100% 20.5 mic |
| 8 | EVA3 100% 20.5 mic | EVA4 100% 20.5 mic | EVA4 100% 20.5 mic | EVA4 100% 20.5 mic | EVA4 100% 20.5 mic |
| 9 | HDPE1 100% 10 mic | HDPE1 100% 10 mic | HDPE1 100% 10 mic | HDPE1 100% 10 mic | HDPE1 100% 10 mic |
| Total | 100.0 mic | 100.0 mic | 100.0 mic | 100.0 mic | 100.0 mic | mic. is the abbreviation for microns

TABLE 3

| Layer | Ex. 6 | Ex. 7 | Ex. 8 | Ex. 9 | Ex. 10 | Ex. 11 |
|---|---|---|---|---|---|---|
| 1 | LDPE1 100% 2 mic | PB1 20% EVA2 22% EMAA-Na 58% 3 mic | EVA1 98% LDPE3 2% 2 mic | EVA1 100% 2 mic | VLDPE1 100% 2 mic | VLDPE1 100% 2 mic |
| 2 | PB1 20% EVA2 22% EMAA-Na 58% 6 mic | PB1 20% EVA2 22% EMAA-Na 58% 5 mic | PB1 20% EVA2 22% EMAA-Na 58% 6 mic | PB1 20% EVA2 22% EMAA-Na 58% 6 mic | PB2 30% EVA2 19% EMAA-Na 51% 6 mic | PB2 30% EVA2 19% EMAA-Na 51% 6 mic |
| 3 | EVA4 100% 29 mic | EVA4 100% 25 mic | EMAA-Na 100% 31 mic | EMAA-Na 100% 31 mic | EMAA-Na 100% 31 mic | EMAA-Na 100% 31 mic |
| 4 | LLDPE-md1 100% 3 mic | LLDPE-md1 100% 3 mic | LLDPE-md1 100% 3 mic | LLDPE-md1 100% 3 mic | LLDPE-md1 100% 3 mic | LLDPE-md1 100% 3 mic |
| 5 | EVOH1 100% 12 mic | EVOH1 100% 12 mic | EVOH2 100% 13 mic | EVOH2 100% 13 mic | EVOH3 100% 13 mic | EVOH1 100% 13 mic |
| 6 | LLDPE-md1 100% 3 mic | LLDPE-md1 100% 3 mic | LLDPE-md1 100% 3 mic | LLDPE-md1 100% 3 mic | LLDPE-md1 100% 3 mic | LLDPE-md1 100% 3 mic |
| 7 | EVA4 100% 30 mic | EVA4 100% 22 mic | EMAA-Na 100% 21 mic | EMAA-Na 100% 21 mic | EMAA-Na 100% 21 mic | EMAA-Na 100% 21 mic |
| 8 | EVA4 100% 30 mic | EVA4 100% 22 mic | EMAA-Na 100% 21 mic | EMAA-Na 100% 21 mic | EMAA-Na 100% 21 mic | EMAA-Na 100% 21 mic |
| 9 | HDPE1 100% 10 mic | LDPE2 100% 5 mic | HDPE2 100% 10 mic | HDPE2 100% 10 mic | HDPE2 100% 10 mic | HDPE2 100% 10 mic |
| Total | 125 mic | 100 mic | 110 mic | 110 mic | 110 mic | 110 mic |

TABLE 4

| Layer | Ex. 12 | Ex. 13 | Ex. 14 | Ex. 15 |
|---|---|---|---|---|
| 1 | EVA1 98% LDPE3 2% 2 mic | EVA1 100% 2 mic | PB2 30% EVA2 19% EMAA-Zn 51% 7 mic | LDPE1 88% EVA2 10% LDPE4 2% 2 mic |
| 2 | PB2 30% EVA2 19% EMAA-Na 51% 6 mic | PB2 20% EVA2 22% EMAA-Na 58% 6 mic | EVA5 100% 7 mic | PB2 30% EVA2 19% EMAA-Na 51% 6 mic |
| 3 | EMAA-Na 100% 31 mic | EMAA-Na 100% 31 mic | EVA4 100% 30 mic | EVA4 100% 27 mic |
| 4 | LLDPE-md1 100% 3 mic | LLDPE-md1 100% 3 mic | LLDPE-md 100% 3 mic | LLDPE-md 100% 3 mic |
| 5 | EVOH3 100% 13 mic | EVOH2 100% 13 mic | EVOH1 100% 8 mic | EVOH1 100% 8 mic |
| 6 | LLDPE-md1 100% 3 mic | LLDPE-md1 100% 3 mic | LLDPE-md 100% 3 mic | LLDPE-md 100% 3 mic |
| 7 | EMAA-Na 100% 21 mic | EMAA-Na 100% 21 mic | EVA4 100% 25 mic | EVA4 100% 20 mic |
| 8 | EMAA-Na 100% 21 mic | EMAA-Na 100% 21 mic | EVA4 100% 25 mic | EVA4 100% 20 mic |
| 9 | HDPE2 100% 10 mic | HDPE2 100% 10 mic | HDPE1 100% 12 mic | HDPE1 100% 11 mic |
| total | 110 mic | 110 mic | 110 mic | 110 mic |

TABLE 5a

| Layer | Ex. 16 | Ex. 17 | Ex. 18 | Ex. 19 | Ex. 20 |
|---|---|---|---|---|---|
| 1 | EPC1 100% 1.5 mic | LDPE1 100% 1.5 mic | EPC1 100% 1.5 mic | LDPE1 77% LLDPE2 3% EVA2 20% 2 mic | EPC3 100% 2 mic |
| 2 | PB2 30% EVA2 19% EMAA-Zn 51% 6.5 mic | PB2 30% EVA2 19% EMAA-Zn 51% 6.5 mic | PB2 30% EVA2 19% EMAA-Zn 51% 6.5 mic | PB2 30% EVA2 19% EMAA-Zn 51% 6 mic | PB2 30% EVA2 19% EMAA-Zn 51% 6 mic |
| 3 | EVA4 100% 27 mic | EVA4 100% 27 mic | EVA4 100% 27 mic | EVA4 100% 27 mic | EVA4 100% 27 mic |
| 4 | LLDPE-md2 100% 3 mic | LLDPE-md2 100% 3 mic | LLDPE-md2 100% 3 mic | LLDPE-md2 100% 3 mic | LLDPE-md1 100% 3 mic |
| 5 | EVOH3 100% 7 mic | EVOH4 100% 7 mic | EVOH4 100% 7 mic | EVOH4 100% 7 mic | EVOH1 100% 7 mic |
| 6 | LLDPE-md2 100% 3 mic | LLDPE-md2 100% 3 mic | LLDPE-md2 100% 3 mic | LLDPE-md2 100% 3 mic | LLDPE-md1 100% 3 mic |
| 7 | EVA4 100% 20 mic | EVA4 100% 41 mic | EVA4 100% 41 mic | EVA4 100% 41 mic | EVA4 100% 20 mic |
| 8 | EVA4 100% 21 mic | HDPE1 100% 11 mic | HDPE1 100% 11 mic | HDPE1 100% 11 mic | EVA4 100% 21 mic |
| 9 | LLDPE1 100% 11 mic | — | — | — | HDPE1 100% 11 mic |
| total | 100 mic | 100 mic | 100 mic | 100 mic | 100 mic |

TABLE 6 reference top webs In this table, the compositions of films very similar to the present films (Ex. C1 and C2) and of a commercial VSP top film (Ex. C3) - not comprising any EZO frangible blend - are reported:

| Layer | Ex. C1 | Ex. C2 | Ex. C3 |
|---|---|---|---|
| 1 | LDPE1 100% 6 mic | LDPE1 98% LDPE4 2% 9 mic | EVA 23 mic |
| 2 | LDPE2 100% 14 mic | EVA5 100% 6 mic | ionomer 27 mic |
| 3 | EVA4/EVA3 100% 19 mic | EMAA-Na 100% 24 mic | PE 8 mic |
| 4 | LLDPE-md2 100% 3 mic | LLDPE-md2 100% 3.5 mic | EVOH 11 mic |
| 5 | EVOH4 100% 8 mic | EVOH1 100% 12.7 mic | PE 8 mic |
| 6 | LLDPE-md2 100% 3 mic | LLDPE-md2 100% 3.5 mic | ionomer 28 mic |
| 7 | EVA4 100% 11 mic | EMAA-Na 100% 40 mic | PE 20 mic |

TABLE 6-continued reference top webs In this table, the compositions of films very similar to the present films (Ex. C1 and C2) and of a commercial VSP top film (Ex. C3) - not comprising any EZO frangible blend - are reported:

| Layer | Ex. C1 | Ex. C2 | Ex. C3 |
|---|---|---|---|
| 8 | LDPE2 100%<br>26 mic | HDPE1 100%<br>12 mic | |
| 9 | HDPE1 100%<br>10 mic | — | |
| Total | 100 mic | 110.7 mic | 125 mic |

The film of Ex. C3 is a commercial film), that the Applicant found in the market and analyzed.

The structure of a commercial bottom web including an EZO frangible blend layer (BOT1), used as support in the manufacture of comparative VSP packages, is summarized in the following table 7:

TABLE 7

BOT1 commercial EZO bottom web

| Layer | Thickness microns | BOT1 |
|---|---|---|
| 1 | 2 | EVA1 100% |
| 2 | 6 | PB1 20%<br>EVA2 22%<br>EMAA-Na 58% |
| 3 | 8 | EVA-md1 100% |
| 4 | 108.5 | PS 45%<br>SBS 55% |
| 5 | 8 | EVA-md1 100% |
| 6 | 6 | EVOH5 100% |
| 7 | 8 | EVA-md1 100% |
| 8 | 108.5 | PS 45%<br>SBS 55% |
| 9 | 10 | EVA-md2 100% |
| 10 | 15 | PETG1 100% |
| Total | 280 | |

The structure of a liner (XX) comprising an EZO frangible blend of commercial trays is reported in the following Table 8

TABLE 8

| Layer | Thickness microns | Resins % by weight |
|---|---|---|
| 1 | 2 | LDPE1 50%<br>EMAA 49%<br>LLDPE2 1% |
| 2 | 6 | PB1 20%<br>EVA2 22%<br>EMAA-Na 58% |
| 3 | 9 | LLDPE-md3 100% |
| 4 | 6 | EVOH1 100% |
| 5 | 20 | PP-md 100% |
| Total | 43 | |

Test Methods

Formability Test

This method was used to evaluate the ability of a VSP top web to be formed over a product. It consists of a standard VSP packaging procedure and a score from 0 to 3 was assigned to express the recurrence of sealing defects named bridging and webbing pleats in the VSP packages.

FIGS. 7A and 7B explain in a schematic way the sealing defects under evaluation, their denomination and the score assigned.

A conventional VSP cycle was performed using Rollstock R570CD or R270CD Multivac machines (Protocol P1) with dome heights, dome temperature, speed and bottom features as reported in the relevant Tables.

The packaged products were parallelepiped (105 mm wide×190 mm long×30 mm high) plastic blocks. For each kind of package, 15 packages were manufactured and scored by two panelists for webbing (pleats located in the corner) and for bridging, being 3 the best score (no webbing, bridging) and 0 the worst score. FIGS. 7A and 7B illustrate the sealing defects evaluated for the score, in particular W (webbing), LB (longitudinal bridging) and TB (transverse bridging).

The average result of this evaluation for the films of the present invention and for reference films are reported in Table 10.

Implosion Resistance Test

This method was used to measure the ability of a VSP film to fill the cavities without breaking. A conventional VSP cycle was performed, as described for the formability test (R570CD or R270CD Multivac machines) but the products packaged were plastic blocks (100 mm wide×190 mm long×25 mm high) having, on the top surface, 10 calibrated holes having the same depth of 20 mm but of different diameters. Holes diameter ranges from 5 to 14 mm, as per FIG. 8. Moreover, for the implosion test, a reduction of the reventing nozzle diameter was applied through a screwed insert: the final diameter of the nozzle was 7 mm instead of 25 mm in order to allow for a slower draping of the film onto the support and the testing block.

During the packaging tests with the plastic block, the film tends to undergo a stretching stress in correspondence of the holes, which increases with the increase of the area of the hole.

The area of the largest hole, before the film broke, was taken as index of implosion resistance, representing the packaging performance of the film, and reported in the corresponding Table 10.

The test was repeated 30 times for each film and the average score calculated.

Gel Content Determination

The gel content express the percentage of a polymeric material insoluble in toluene and it is an index of the level of cross-linking of the polymer in that material. In case the material is a multilayer film, the test may be carried out on the entire film—if all the polymers making the films, before cross-linking, are toluene-soluble- or on the part of it, made of polymers which before cross-linking are toluene-soluble by delaminating the desired layers and by not submitting to the test those layers whose polymers are not soluble in toluene per se, such as for instance EVOH or ionomers.

If the gel content is evaluated on the toluene-soluble part of the film only, as explained above, the result represents a good index of a successful irradiation for the whole film, including for the layers not analyzed. In fact, as the present films are generally prepared by coextrusion of all layers followed by irradiation, then all the layers have been accordingly subjected to the same irradiation.

As used herein, the term "soluble in toluene" or "toluene-soluble" refers to a solubility of at least 1.25 g/l at the boiling temperature of toluene (about 110° C., at standard pressure of 1 atm, measured after boiling the sample in toluene for 30 minutes).

The result is expressed as percentage by weight of the undissolved material (i.e. the cross-linked material) after toluene treatment with respect to the total weight of the initial material. The test was performed according to the following procedure.

A square of wire metal gauze (80 mesh,15 cm×15 cm) was cut and cleaned by submersion in a beaker containing toluene. After solvent evaporation, the wire gauze was given a funnel shape and weighted (weight B). 120 ml of toluene were put in a 200 ml beaker and heated on a hot plate.

A sample of the material of about 150 mg was weighted (weight A) and put it in the boiling toluene for 30 minutes, under stirring. The solution was then filtered on the wire gauze and the gel remained on the wire gauze. The wire gauze with the gel was dried under hood, weighted (weight C) after 24 h and 48 h up to a constant weight.

The gel content percentage was calculated, for each weighing with the following formula: $(C-B)/A \times 100$ and the average value was calculated. The analysis was repeated twice for each material.

Sealing Test

In order to evaluate the sealability of the films of the present invention and of reference films, VSP packages were manufactured at different set temperatures of the dome, while keeping constant all the other parameters (package components, product, manufacturing protocol as reported in the relevant Tables 10 to 13). For the films of the invention, the support did not comprise any EZO frangible blend layer while for reference films a commercial EZO bottom web was used (BOT1 Table 7).

Sealability of the top films and openability of the resulting packages were judged by panelists based on following criteria:

+++: (good seal) excellent VSP package, very good sealing of the top film to the support through the whole surface; smooth opening through 100% of the support surface, regular force applied, good cohesive failure mechanism;

++: (acceptable seal) still acceptable VSP package but presence of few, small, unsealed areas, smooth opening through cohesive failure mechanism;

+: (bad seal) unacceptable VSP package, bad sealing of top web to the support with few no sealed areas.

Opening Force

For the evaluation of the opening strength or opening force required to open a finished VSP package, the following internal standard procedure was used.

After removal of the product, strips were cut from each VSP packages, prepared starting from the selected top and bottom webs sealed together in a VSP packaging cycle, according to the protocol and under the setting conditions reported in the relevant Tables. The specimens were obtained from the bottom flat part of the packages, with specimen dimensions of 2.54 cm (1 inch) of width and about 15-20 cm of length cut along the machine direction (namely along the direction of unwinding of the roll). Six strips for each packaging conditions were prepared and tested. The packed product was ham of about 60 g placed off centered onto one half of the bottom, the other half being used to cut the specimens for measurement of the opening force.t.

The strips are manually separated in order to provide detached top web and bottom web portions sufficient to be fixed into the lower clamp and into the upper clamp of a dynamometer.

The area to be tested should lie in the middle of the two clamps, and an adequate tensioning between the two extremities of the fixed sample should be obtained.

Figure 5:
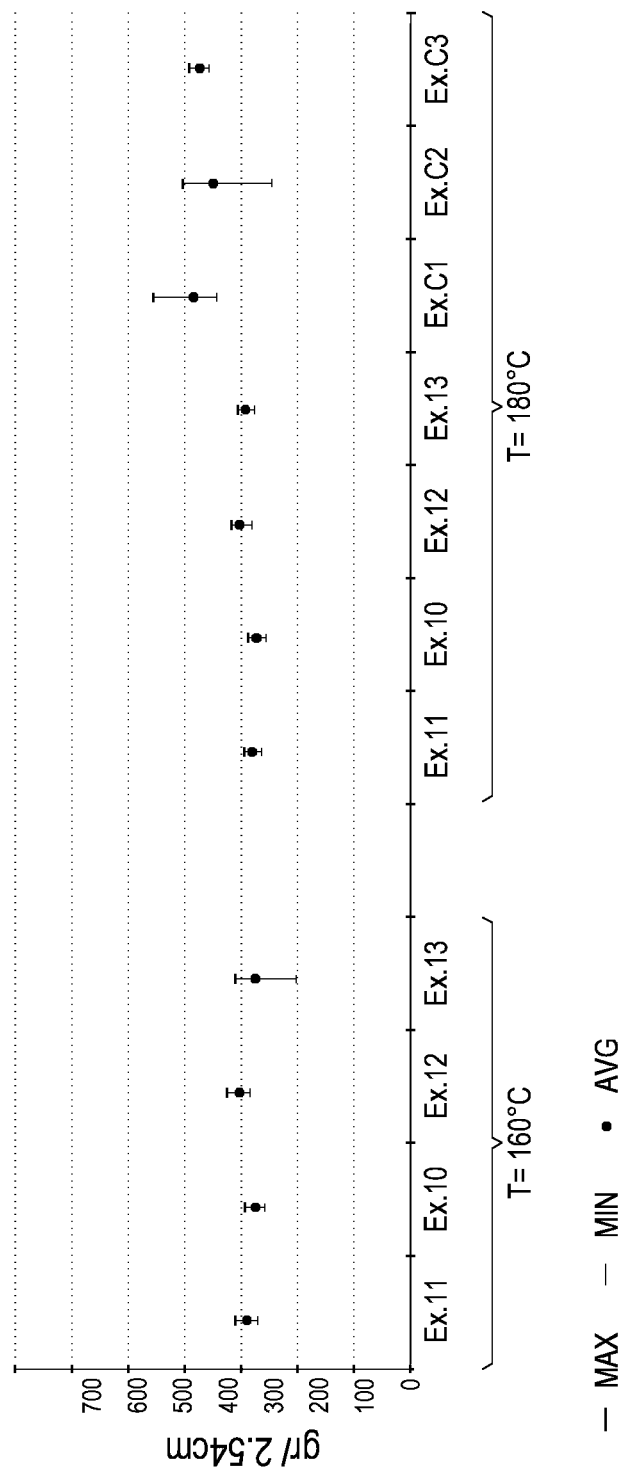
FIG. 5 is a graph showing the peeling forces required for opening VSP packages of the invention (Ex. 10-13 top webs) vs prior art VSP packages (Ex. C1-C3)

The average value of the opening force was calculated (see the values reported in Tables 10 and 15 and the graph of FIG. 5).

Dynamometer conditions were:
equipment: Instron
starting jaw distance: 2 cm
crosshead speed: 300 mm/min,
length of the seal opened for measure: 5 cm.

The instrument measured the force needed to separate the top from the bottom web, in particular measured the average force applied for the opening of 5 cm of the seal for each sample (gf/2.54 cm). Finally, the average of force values for the 6 samples tested was calculated and reported in the relevant table.

Manufacture of VSP Packages

In the following Table 9, VSP packages components and their general manufacturing conditions are summarized:

TABLE 9

| VSP package | Top film | Support | Equipment/Protocol P1, P2 or P3 |
|---|---|---|---|
| VSP1 A | Ex. 1 | BOT1 (EVA seal layer) frangible blend | Multivac R570CD (dome 60 mm height) P1 |
| VSP2 A | Ex. 1 | BOT1 (EVA seal layer) frangible blend | Multivac R570CD (dome 100 mm height)/P1 |
| VSP3 A | Ex. 2 | Pentafood Kpseal APET/PE, 400 mic | Multivac R570CD (dome height 50 mm)/P1 |
| VSP4 A | Ex. 3 | Pentafood Kpseal APET/PE, 400 mic | Multivac R570CD (dome height 50 mm)/P1 |
| VSP5 A | Ex. 4 | Pentafood Kpseal APET/PE, 400 mic | Multivac R570CD (dome height 50 mm)/P1 |
| VSP6 A | Ex. 5 | Pentafood Kpseal APET/PE, 400 mic | Multivac R570CD (dome height 50 mm)/P1 |
| VSP7 A | Ex. 6 | Pentafood Kpseal APET/PE, 400 mic | Multivac R570CD (dome height 50 mm)/P1 |
| VSP8 A | Ex. 7 | Pentafood Kpseal APET/PE, 400 mic | Multivac R570CD (dome height 50 mm)/P1 |
| VSP9 A | | A: Pentafood Kpseal APET/PE, 300 mic | R272 CD Multivac, 6,4 cycles/min, vacuum < 15 mbar, dome height 30 mm; forming depth 5 mm/P1 |
| VSP9 B | Ex. 8 | B: UBRT 1520-30 by Cryovac | Equipment T200 by Multivac, vacuum < 15 mbar, dome height 10 mm/P2 |

TABLE 9-continued

| VSP package | Top film | Support | Equipment/Protocol P1, P2 or P3 |
|---|---|---|---|
| VSP9 C | | C: UBRT1826-27 by Cryovac | Equipment Trave E340 Mondini, 6,4 cycles/min, vacuum < 15 mbar, dome height 25 mm/P3 |
| VSP10 A, B, C | Ex. 9 | A/B/C as above | as per relevant experimental description P1/P2/P3 |
| VSP11 A, B, C | Ex. 10 | A/B/C as above | as per relevant experimental description P1/P2/P3 |
| VSP12 A, B, C | Ex. 11 | A/B/C as above | as per relevant experimental description P1/P2/P3 |
| VSP13 A, B, C | Ex. 12 | A/B/C as above | as per relevant experimental description P1/P2/P3 |
| VSP14 A, B, C | Ex. 13 | A/B/C as above | as per relevant experimental description P1/P2/P3 |
| VSP15 A, B, C | Ex. 14 | A/B/C as above | as per relevant experimental description P1/P2/P3 |
| VSP16 A, B, C | Ex. 15 | A/B/C as above | as per relevant experimental description P1/P2/P3 |
| C-VSP17 A, B, C | Ex. C1 | A: BOT1 EZO frangible blend B: tray EOST1520-30 EZO frangible blend C: tray EDT1826-27 EZO frangible blend | as per relevant experimental description P1/P2/P3 |
| C-VSP18 A, B, C | Ex. C2 | A: BOT1 EZO frangible blend B: tray EOST1520-30 EZO frangible blend C: tray EDT1826-27 EZO frangible blend | as per relevant experimental description P1/P2/P3 |
| C-VSP19 B, C | Ex. C3 | B: tray EOST1520-30 EZO frangible blend C: tray EDT1826-27 EZO frangible blend | as per relevant experimental description P2/P3 |
| VSP20 | Ex. 18 | Commercial Cardboard | as per relevant experimental description P2 (Equipment tray skin Cryovac VS26) |

Keys:
Pentafood Kpseal APET/PE, 400 or 300 mic, rectangular clear tray 250 × 135 mm2, depth 5 mm, APET/PE, 350 mic/50 mic (tot 400 mic) or 250 mic./50 mic. (tot. 300 mic.);
UBRT 1520-30 by Cryovac: ultra barrier rigid tray clear, thickness 750 mic., PP/liner (liner of 45 mic, made of a PE seal layer and a barrier EVOH layer) (length 15 cm × width 20 × depth 30 mm);
UBRT1826-27 by Cryovac: ultra barrier rigid tray, black pigmented, web thickness 750 mic., PP/liner (liner of 45 mic, made of a PE seal layer and a barrier EVOH layer) (length 18 cm × width 26 × depth 27 mm).
BOT1 (web total thickness 280 mic, EZO frangible blend, see Table 7)
EDT1826-27 (rigid tray total thickness 750 mic, PP, liner XX EZO frangible blend Table 8) (length 18 cm × width 26 × depth 27 mm).
EOST1520-30 (rigid tray total thickness 750 mic PP/liner XX EZO frangible blend Table 8) length 15 cm × width 20 × depth 30 mm);
Commercial Cardboard: flat cardboard (32 cm × 19 cm) code B0847, total thickness 850 microns, made of a cardboard core (about 800 microns) and of two polypropylene coatings of similar thickness (gold and silver colored) (the sealing surface in the present trials was the gold one);
C-VSP: comparative VSP package
Protocol P1: a standard VSP packaging process wherein the support is thermoformed in line from a thermoplastic bottom web unwind from a roll (Rollstock)
Protocol P2: a standard VSP packaging process performed with conventional VSP equipment (for instance Multivac T200 or Cryovac VS26) wherein the support is a pre-formed flat or shallow tray.
Protocol P3: a VSP process wherein the support is perforated, before or within the sealing station, to improve the phase of extraction of gas from the package Keys:
Pentafood Kpseal APET/PE, 400 or 300 mic, rectangular clear tray 250×135 mm2, depth 5 mm, APET/PE, 350 mic/50 mic (tot 400 mic) or 250 mic./50 mic. (tot. 300 mic.);
UBRT 1520-30 by Cryovac: ultra barrier rigid tray clear, thickness 750 mic., PP/liner (liner of 45 mic, made of a PE seal layer and a barrier EVOH layer) (length 15 cm×width 20×depth 30 mm);
UBRT1826-27 by Cryovac: ultra barrier rigid tray, black pigmented, web thickness 750 mic., PP/liner (liner of 45 mic, made of a PE seal layer and a barrier EVOH layer) (length 18 cm×width 26×depth 27 mm).
BOT1 (web total thickness 280 mic, EZO frangible blend, see Table 7)
EDT1826-27 (rigid tray total thickness 750 mic, PP, liner XX EZO frangible blend Table 8) (length 18 cm×width 26×depth 27 mm).
EOST1520-30 (rigid tray total thickness 750 mic PP/liner XX EZO frangible blend Table 8) length 15 cm×width 20×depth 30 mm);
Commercial Cardboard: flat cardboard (32 cm×19 cm) code B0847, total thickness 850 microns, made of a cardboard core (about 800 microns) and of two polypropylene coatings of similar thickness (gold and silver colored) (the sealing surface in the present trials was the gold one);
C-VSP: comparative VSP package
Protocol P1: a standard VSP packaging process wherein the support is thermoformed in line from a thermoplastic bottom web unwind from a roll (Rollstock)
Protocol P2: a standard VSP packaging process performed with conventional VSP equipment (for instance Multivac T200 or Cryovac VS26) wherein the support is a pre-formed flat or shallow tray.
Protocol P3: a VSP process wherein the support is perforated, before or within the sealing station, to improve the phase of extraction of gas from the package
The packaged products were wet rectangular pads (75 mm×150 mm, Dry-Loc pad by Cryovac), unless otherwise reported.

The packages were manufactured with the specific equipment and under conditions detailed in each pertinent table.

Unless otherwise stated, the relevant sealing conditions for the skin packaging cycles according to protocols P1, P2 and P3, were the following:

Top web pre-heating (Protocol P1): 130-140° C.
Dome Temperature: 200-230° C.
Heating time: 1-5 sec.
Vacuum in the package before sealing: 1-100 mbar
Reventing time: 1 to 4 sec (in a single or in two reventing steps)
Formability, Implosion Resistance, Opening Strength and Breakages Formability, implosion resistance, opening strength and breakage results are collected in the following Table 10. The test were performed as described in the test methods section, according to Protocol P1 (Rollstock), using R570 CD Multivac machine with a Dome of 30 mm of height, on the films of the invention and on reference films.

A comparison among all the packages (VSP11A-14 A and C-VSP17A-18A) was performed at 200° C. Two panelists evaluated films performance in terms of implosion on 30 samples for each kind of VSP package (30 packages for each combination of top, bottom and temperature) and in terms of formability (webbing and bridging) on 15 samples for each kind of VSP package.

As appears from the results of Table 10, the EZO top films of the invention showed unexpected improved or at least comparable formability and implosion resistance with respect to non-EZO top films (comparatives VSP packages comprising C1 or C2 or C3 top webs).

In particular, from the data collected in Table 10 and from the observations of the packages at opening, it resulted that:

regarding formability at 200° C. (Dome temperature), the performance was very good in case of rectangular block, especially with the film of Ex. 10;

TABLE 10

| VSP package (dome T ° C.) | Top film | Formability (score: 0-3) W | TB | LB | Implosion resistance mm$^2$ | Opening strength gf/2.54 cm | Breakages |
|---|---|---|---|---|---|---|---|
| VSP1 (210) | Ex. 1 dome 60 mm | 3.0 | 3.0 | 2.8 | 12.2 | | |
| VSP2 (210) | Ex. 1 dome 100 mm | 3.0 | 2.9 | 2.8 | 14.5 | | |
| VSP3 (230) | Ex. 2 | — | — | — | 10.9 | 404 | 6/15 RB |
| VSP4 (230) | Ex. 3 | 2.7 | 2.8 | 2.8 | 10.5 | 502 | 12/30 IB 1/15 RB |
| VSP5 (210) | Ex. 4 | — | — | — | 12.3 | 512 | 12/30 IB 6/15 RB |
| VSP6 (210) | Ex. 5 | 2.4 | 2.3 | 2.3 | 12.4 | 422 | 3/30 IB 3/15 RB |
| VSP7 (210) | Ex. 6 | 2.9 | 3.0 | 3.0 | 13.2 | 514 | 3/60 IB |
| VSP11 A (150) | Ex. 10 | 3.0 | 2.8 | 3.0 | 13.7 | | |
| VSP11 A (200) | Ex. 10 | 3.0 | 2.9 | 3.0 | 12.4 | | |
| VSP12 A (150) | Ex. 11 | 3.0 | 2.7 | 3.0 | 12.7 | | |
| VSP12 A (200) | Ex. 11 | 3.0 | 2.8 | 3.0 | 11.8 | | |
| VSP13 A (150) | Ex. 12 | 2.1 | 2.4 | 3.0 | 13.8 | | |
| VSP13 A (200) | Ex. 12 | 2.5 | 2.7 | 3.0 | 11.9 | | |
| VSP14 A (200) | Ex. 13 | 2.6 | 2.6 | 3.0 | 12.3 | | |
| C-VSP17 A (170) | Ex. C1 | 2.2 | 2.9 | 3.0 | 10.5 | | |
| C-VSP17 A (200) | Ex. C1 | 2.6 | 2.9 | 2.2 | 8.9 | | |
| C-VSP18 A (170) | Ex. C2 | 2.7 | 2.7 | 2.9 | 10.5 | | |
| C-VSP18 A (200) | Ex. C2 | 2.6 | 2.7 | 2.9 | 10.5 | | |

RB = rectangular blocks;
IB = implosion blocks;
W = webbing;
LB = longitudinal bridging;
TB = transverse bridging;
VSP: packages according to the invention, comprising a top web with an EZO frangible blend and a bottom without an EZO frangible blend.
C-VSP: comparative packages, comprising a conventional non-EZO VSP top film (Ex. C1 of 100 μm; Ex. C2 of 110 μm) and a bottom web with EZO frangible blend (BOT1).

The test were performed at the minimum Dome Temperature which provided for an acceptable seal, in particular at 150° C. for films of Ex. 10, Ex. 11, Ex. 12, at 170° C. for films of Ex. C1 and Ex. C2, at 200° C. for film of Ex. 14.

packages VSP1 and VSP2 in which the film of Ex. 1 was sealed to an APET/PE support, showed good hermeticity, good drip retention and smooth opening with moderate peel opening force;

the films of Ex. 4, Ex. 5, Ex. 6 and of Ex.10, Ex. 11, Ex. 12 and Ex. 13 and the corresponding VSP packages VSP5-VSP7 and VSP11-VSP14 gave very interesting performance in terms of sealability and easy opening, in particular the film of Ex. 5 scored acceptable results in both implosion and formability tests, the film of Ex. 6 was one of the best the tested films as to both implosion and formability, if compared with standard top web films (see the worse performance of comparative VSP packages C-VSP17 and C-VSP18 comprising conventional top webs of Ex. C1 and C2), the film of Ex. 7 in which the EZO frangible blend was also in the seal layer, was satisfactory enough in terms of easy opening, the VSP packages made with the films of Ex. 5 and 6 were also visually evaluated for optics and sealability: both packages appeared clear, glossy and without visible defects of sealing (no pleats), the films of Ex. 10 to Ex. 13 (VSP11 to VSP14) had very good formability scores, with no or minimal recurrence of webbing and bridging pleats (see the rather high bridging scores, predictive of good formability (test passed), the films of the invention of Ex. 10, 11 and 12 showed exceptionally high implosion resistance with scores well above the standards reached with the reference films Ex C1 and Ex. C2, even at 150° C. (see the significantly higher implosion values of 13.7, 12.7 and 13.8 vs reference values of only 10.5 at 170° C.).

Overall, the films of the invention at 200° C. were better than the reference films, especially in terms of implosion resistance.

Sealing Properties

The behavior of the top films of the invention (Ex. 8 to 15) under different VSP packaging conditions, was compared to that of reference films Ex. C1 and Ex. C2, having a similar thickness and composition but without the EZO frangible blend layer (C-VSP17 and 18)

In terms of sealability, we also compared a marketed Top Web (Ex. C3), which does not include any EZO frangible blend layer too (C-VSP19).

In particular, sealing properties of the films of the invention and of comparative films were evaluated through a sealing window from 140° C. to 200° C. using the three different VSP protocols: P1 (Roll Stock), P2 (Tray Skin) and P3 (Darfresh On tray).

The packaged product was a wet rectangular pad (75 mm×150 mm, Dry-Loc pad by Cryovac)

The support was a rectangular transparent tray of 250× 135 mm², depth of 5 mm, APET/PE, 250 mic./50 mic. (total thickness 300 micron) (Pentafood Kpseal).

Two panelists checked 10 packages for each condition and for each film for pleats formation and for manual openability (peelability).

The scores, obtained under the different protocols, are shown in the following Tables 11 to 13, and summarized in Table 14:

TABLE 11

VSP packages manufactured according to procedure P1 (Roll-stock R272 CD Multivac, 6,4 cycles/min, vacuum < 15 mbar, bottom web Pentafood, Kpseal APET/PE, 300 mic)

| Dome height: | | Dome T. ° C. | | | | | | |
|---|---|---|---|---|---|---|---|---|
| 30 mm | | 140 | 150 | 160 | 170 | 180 | 190 | 200 |
| VSP15A | Ex. 14 | ++ | ++ | +++ | +++ | | | |
| VSP16A | Ex. 15 | ++ | ++ | +++ | +++ | | | |
| VSP12A | Ex. 11 | + | + | +++ | +++ | | | |

TABLE 11-continued

VSP packages manufactured according to procedure P1 (Roll-stock R272 CD Multivac, 6,4 cycles/min, vacuum < 15 mbar, bottom web Pentafood, Kpseal APET/PE, 300 mic)

| Dome height: | | Dome T. ° C. | | | | | | |
|---|---|---|---|---|---|---|---|---|
| 30 mm | | 140 | 150 | 160 | 170 | 180 | 190 | 200 |
| VSP11A | Ex. 10 | + | + | +++ | +++ | | | |
| VSP13A | Ex. 12 | + | +++ | +++ | +++ | | | |
| VSP9A | Ex. 8 | + | + | + | + | ++ | +++ | |
| VSP10A | Ex. 9 | + | + | + | + | ++ | ++ | +++ |
| VSP14A | Ex. 13 | + | + | + | + | ++ | ++ | +++ |
| C-VSP17 A | Ex. C1 | + | + | ++ | +++ | +++ | | |
| C-VSP18 A | Ex. C2 | + | + | ++ | +++ | +++ | | |

+++: good seal;

++: acceptable seal;

+: bad seal (see the explanation above for further details)

As it clearly appears from the data reported in Table 11 above, the films of the invention of Ex. 10, 11, 12 and 14 provides for excellent VSP packages with very good sealing through the whole surface starting from 150° C. (low seal initiation temperature).

TABLE 12

VSP packages were manufactured according to procedure P3 (Darfresh On Tray) using Equipment Trave E340 by Mondini, 6,4 cycles/min, vacuum < 15 mbar. The equipment perforated the support (4 holes, dimension: 3 × 6 mm², hole shape oval). Support: ultra barrier rigid tray (UBRT1826-27 by Cryovac, black pigmented, web thickness 750 mic., PP/liner (liner of 45 mic, made of a PE seal layer and a barrier EVOH layer)

| | | Dome T. ° C. | | | |
|---|---|---|---|---|---|
| Dome height: 25 mm | | 140 | 150 | 160 | 170 |
| VSP15C | Ex. 14 | ++ | ++ | +++ | +++ |
| VSP16C | Ex. 15 | ++ | ++ | ++ | +++ |
| VSP12C | Ex. 11 | ++ | ++ | +++ | +++ |
| VSP11C | Ex. 10 | ++ | +++ | +++ | +++ |
| VSP13C | Ex. 12 | ++ | +++ | +++ | +++ |
| VSP9C | Ex. 8 | ++ | +++ | +++ | +++ |
| VSP10C | Ex. 9 | ++ | +++ | +++ | +++ |
| VSP14C | Ex. 13 | +++ | +++ | +++ | +++ |
| C-VSP17 C | Ex. C1 | + | + | + | ++ |
| C-VSP18 C | Ex. C2 | + | + | + | ++ |
| C-VSP19 C | Ex. C3 | + | + | ++ | +++ |

Keys:

see above

Keys: see above

It can be appreciated that the films of the invention show acceptable or excellent sealability even at dome temperatures as low as 150° C. or even lower.

TABLE 13

VSP packages were manufactured according to procedure P2 (Tray skin) Equipment T200 by Multivac or Cryovac VS26, vacuum < 15 mbar.
Supports: for all VSP packages but VSP20, the support was UBRT 1520-30 by Cryovac, clear, web thickness 750 mic., PP/liner (liner of 45 mic, made of a PE seal layer and a barrier EVOH layer); for VSP20 the support was a flat cardboard (32 cm × 19 cm) code B0847, total thickness about 850 microns, made of a core of cardboard (about 800 microns) and of two polypropylene coatings (gold and silver) (the sealing surface was the gold one); for C-VSP packages the support was EOST1520-30 - 750 mic PP/liner XX with EZO frangible blend (see Table 8)

| | | Dome T. ° C. | | | | | |
|---|---|---|---|---|---|---|---|
| Dome height: 10 mm | | 140 | 150 | 160 | 170 | 190 | 200 |
| VSP15B | Ex. 14 | + | + | + | ++ | | |
| VSP16B | Ex. 15 | + | ++ | +++ | +++ | | |
| VSP12B | Ex. 11 | +/++ | ++ | +++ | +++ | | |
| VSP11B | Ex. 10 | +/++ | +++ | +++ | +++ | | |
| VSP13B | Ex. 12 | + | +++ | +++ | +++ | | |
| VSP9B | Ex. 13 | + | ++ | +++ | +++ | | |
| VSP10B | Ex. 9 | + | ++ | +++ | +++ | | |
| VSP14B | Ex. 13 | +/++ | +++ | +++ | +++ | | |
| C-VSP17 B | Ex. C1 | + | + | ++ | +++ | | |
| C-VSP18 B | Ex. C2 | + | + | + | +++ | | |
| C-VSP19 B | Ex. C3 | + | +++ | +++ | +++ | | |
| VSP20 | Ex. 18 | | | | | + | +++ |

Keys:
see above

Keys: see above

Under these conditions, the best films of the inventions were those of Ex. 10, 11 and 13, with excellent sealing performance starting from 150° C.

TABLE 14 general summary of the best sealing performance
For process conditions and equipment, see Tables from 10 to 13 above.

| | | Process | Ex. 11 | Ex. 10 | Ex. 12 | Ex. 13 | Ex. C1 | Ex. C2 | Ex. C3 |
|---|---|---|---|---|---|---|---|---|---|
| Dome T ° C. | 140 | P3 | ++ | ++ | ++ | +++ | + | + | + |
| | | P2 | ++ | ++ | + | ++ | + | + | + |
| | | P1 | + | + | + | + | + | + | — |
| | 150 | P3 | ++ | +++ | +++ | +++ | + | + | + |
| | | P2 | ++ | +++ | +++ | +++ | + | + | +++ |
| | | P1 | + | + | +++ | + | + | + | — |
| | 160 | P3 | +++ | +++ | +++ | +++ | + | + | ++ |
| | | P2 | +++ | +++ | +++ | +++ | ++ | + | +++ |
| | | P1 | +++ | +++ | +++ | + | ++ | ++ | — |
| | 170 | P3 | +++ | +++ | +++ | +++ | ++ | ++ | +++ |
| | | P2 | +++ | +++ | +++ | +++ | +++ | +++ | +++ |
| | | P1 | +++ | +++ | +++ | + | +++ | +++ | — |
| | 180 | P3 | +++ | +++ | +++ | +++ | +++ | +++ | +++ |
| | | P2 | +++ | +++ | +++ | +++ | +++ | +++ | +++ |
| | | P1 | +++ | +++ | +++ | ++ | +++ | +++ | — |

As it appears from the summary of Table 14 above, the films of the inventions provided for good or excellent sealability even at low temperatures (see in particular the results at 140°-150° C. of packages manufactured under Protocol P3) differently from the comparative films.

The films that best performed under Protocol P3 (Darfresh On Tray) turned out to be the films of Ex. 11, Ex. 10, Ex. 12 and Ex. 13 that already at 150° C. showed acceptable results, better than references films.

Under Protocol P2 (Tray Skin) the best performance was obtained with the films of Ex. 10, Ex. 12 and Ex.13, that show good sealability and openability starting from 150° C., in line with the reference film Ex. C3 but better than the films of Ex. C1 and Ex. C2.

Under Protocol P1 Rollstock the best films in terms of sealability were the films of Ex. 11, Ex. 10 which provided good sealing at 160° C. and particularly of Ex. 12 (maximum score from 150° C.).

Opening Force

The opening performance of the above VSP packages VSP11C-VSP14C vs prior art packages C-VSP17 C (film of Ex. C1), C-VSP18 C (film of Ex. C2) and C-VSP19 C (film Ex. C3) made under the same conditions following Protocol P3 (Darfresh On Tray) was assessed by measuring the opening force applied to, according to the opening force test method herein described.

FIG. 5 shows the diagram of the opening forces (MAX maximum, MIN minimum and AVG average values) for opening VSP packages of the invention (VSP 11C to VSP14C packages including films of Ex. 10 to 13 as top webs) sealed to a UBRT1826-27 tray by Cryovac (PP/liner 750 mc tot, 45 mic liner PE/EVOH) at the temperatures of 160° C. (left) and 180° C. (center), in comparison with VSP packages of known films (films of Ex. C1-C3) (right) sealed at 180° C. to commercial trays EDT1826-27 (total thickness 750 mic PP, liner XX as depicted in Table 8) comprising the EZO frangible blend.

The following Table 15a summarizes the opening force data of the graph:

TABLE 15a

| | Opening force (g/2.54 cm) | | | | | | | | | | |
|---|---|---|---|---|---|---|---|---|---|---|---|
| | Seal T. 160° C. | | | | Seal T. 180° C. | | | | | | |
| | Ex. 11 | Ex. 10 | Ex. 12 | Ex. 13 | Ex. 11 | Ex. 10 | Ex. 12 | Ex. 13 | Ex. C1 | Ex. C2 | Ex. C3 |
| AVG | 285 | 254 | 304 | 272 | 281 | 269 | 299 | 295 | 384 | 342 | 353 |
| MAX | 308 | 283 | 324 | 309 | 293 | 286 | 317 | 318 | 454 | 401 | 388 |
| MIN | 263 | 247 | 280 | 203 | 259 | 251 | 280 | 278 | 339 | 234 | 339 |
| St D | 17 | 11 | 15 | 37 | 12 | 12 | 13 | 13 | 43 | 57 | 16 |

St D: standard deviation

As it appears in the graph of FIG. 5 and from the values reported in Table 15a, the packages according to the invention, in which the top film includes the EZO frangible blend (films of Ex. 10 to 13), open smoothly with comparable values of opening force.

Preliminary data, not reported above, showed that the packages with top films of Ex. 8 and 9, in which the EZO frangible blend comprises a lower amount of polybutylene (20%) require a slightly higher force to be opened with respect to those other films of the invention, with a top web including an EZO frangible blend with a content of polybutylene of 30% by weight.

Furthermore, in view of the lower values of standard deviations, it appears that the opening system according to the invention—with the EZO frangible blend in the top—is more consistent than the prior system—in which the same kind of blend was part of the bottom web.

The lower variability of the measured strength values for the VSP packages of the present invention corresponds to a more reliable and uniform opening system than the prior art, where the same EZO frangible blend placed in an uncrosslinked bottom web provided for a higher variability of the opening strengths. It appears that cross-linking not only does not jeopardize the efficiency of the cohesive failure mechanism but, surprisingly, it even improves the reliability of the system.

VSP packages (VSP20) comprising the film Ex. 18 as top web, sealed onto the golden polypropylene surface of the commercial flat cardboard (code B0847) previously defined as bottom, and 50 g of mortadella as product, were manufactured according to Protocol P2 on a Cryovac VS26 tray skin machine with the following settings: vacuum time 7 sec., flat dome, dome temperatures: 190° C. and 200° C.

Three packages for each conditions were evaluated for the opening performance, with the following results:

TABLE 15b

| | Opening force (g/2.54 cm) | |
|---|---|---|
| | Seal T. 190° C. | Seal T. 200° C. |
| AVG | 295 | 332 |
| MAX | 282 | 314 |
| MIN | 317 | 352 |
| St D | 19 | 19 |

As it appears from the data reported in Table 15b, the VSP20 packages according to the invention, in which the top film includes the EZO frangible blend (film of Ex. 18) and the bottom is a polypropylene coated cardboard, show good values of opening force to which correspond a smooth manual opening of the packages. Machinability:

The experimental films of the invention were run on different equipment and conditions (see protocols P1, P2 and P3) but never showed any issue in terms of cutting as conversely happened for the films taken as reference.

In conclusion, all the tested films of the invention performed well on all the tested machines and conditions.

Microwave Cook-In Test

This test evaluates the suitability of the tested films as top webs of VSP packages in cooking applications in microwave oven.

The test was performed using the film of Ex. 10 as top web sealed on trays UBST 1520-30 and UBST 1826-27 (tot. thickness—750 um, PP/liner YY as depicted in Table 16) according to Protocol P2 (Tray Skin) and Protocol P3 (Darfresh On Tray), both machines with Dome temperature of 150° C., packing marinated salmon. The packages were put in the oven still closed and heated at 900 W for 3 min. During the cooking, the packs showed ballooning (the top web inflated as a result of the pressure exerted by the internal vapors) and self-venting (the sealing between the top and the tray failed on the long side releasing the vapors).

The packs were manually opened by two panelists after cooking: they were easy to be opened and the sealing force was homogenous and consistent along the package.

The salmon resulted evenly cooked.

In conclusion, the packages behaved very well in this test, in terms of ballooning and self-venting. At the end of the cooking cycle, they opened easily without any liner delamination and without forming fringes. Fringes formation is a common drawback of prior art VSP microwavable packages in which the EZO frangible blend is incorporated in the bottom web.

The present packages, incorporating the EZO system in the top web, provide for unexpected advantages in terms of versatility and cheapness, as they allow to manufacture VSP EZO microwavable packages for cook-in applications using, as a support, simple and inexpensive trays instead of much more costly and engineered bottom webs.

Shelf-Life Evaluation

The barrier performance of the top web used in a VSP package is reported to impact significantly on meat color evolution and stability during storage.

A shelf-life test on fresh beef was carried out in order to compare the color performance of a VSP package comprising a film of the invention, which comprises a EZO frangible blend layer, as top web with a standard one (no EZO layer in the top web).

The film of Ex. 10, with EZO frangible blend, was compared with the film of Ex. C2 of similar structure but without the EZO frangible blend layer, both films having a thickness of 110 µm.

VSP packages including fresh beef steaks were manufactured according to Protocol P3 and tested for color shelf life performance.

Technical Details

Product: beef rib eye roll steaks of about 300-350 g, 8 days after slaughtering.

Machine: Multivac R272CD.

Top webs: Ex. 10 vs Ex. C2.

Tray: 650 micron of PP, with a liner (YY, 45 microns) having the composition reported in Table 16.

TABLE 16

| Layer | Thickness microns | Resin and % by weight |
|---|---|---|
| 1 | 16 | LDPE5 0.50% |
|   |    | LDPE6 0.50% |
|   |    | LDPE4 2% |
|   |    | VLDPE2 30% |
|   |    | MDPE 67% |
| 2 | 4 | LLDPE-md3 100% |
| 3 | 6 | EVOH1 100% |
| 4 | 4 | PP-md 60% |
|   |   | LLDPE-md3 40% |
| 5 | 15 | EPC2 100% |
| Total | 45 | |

Color evaluation: Instrumental (Minolta CM600d colorimeter) and Visual (by naked-eye).

Storage conditions: 1-2° C., about 60% RH, display light during the day.

Figure 6:
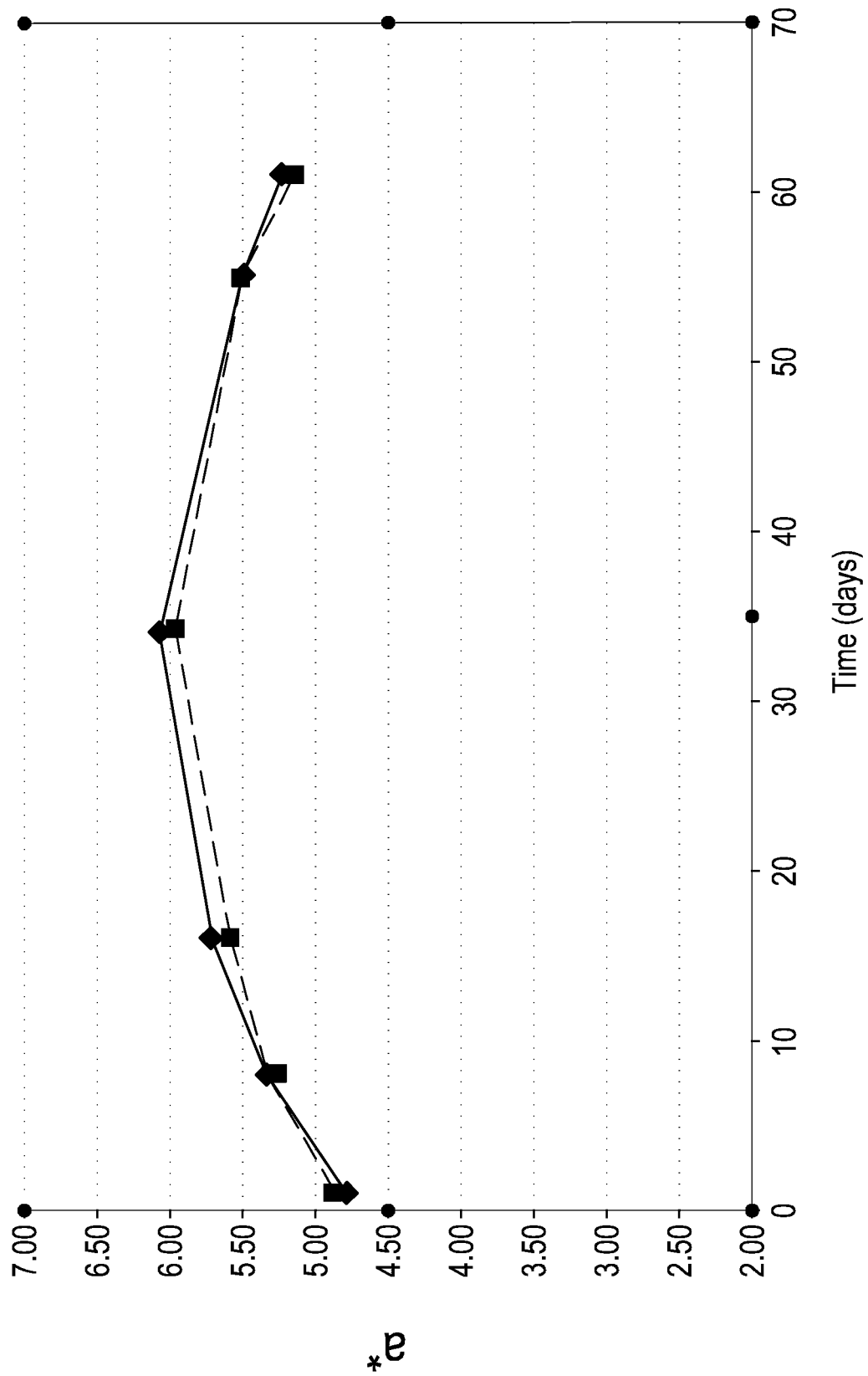
FIG. 6 is a graph relating to the color of meat (a*) packaged in VSP packages of the invention and of prior art vs time (days) (shelf-life evaluation).

Color data were reported in a graph (FIG. 6) with reference to the a* parameter (an index of the redness of the product—the higher the a* index the redder the product) that describes the evolution of the color during storage.

From the test results, it appears that all VSP packages—comprising the films of the invention or comparative films as top webs—showed a rather comparable and satisfactory behavior that ensured color stability to the meat for over one month.

In the second month, storage color redness showed some decline that was evident at the end of the month resulting in a loss of vividness. At the same time, symptoms of spoilage were evident with the formation of gas pockets in the pack and off-odors upon opening. However, no evident or spot discolorations was observed and the meat color remained acceptable all over the storage life.

In conclusion, it appeared that the film of Ex. 10 with the EZO frangible blend layer has a shelf-life performance comparable to the standard film of Ex. C2.

In conclusion, the films of the present invention allow for a significant simplification of VSP packages: a highly engineered top web includes most of the functions requested for a VSP package (excellent formability and implosion resistance, microwaveability, anti-odor and easy openability) thus allowing an extreme versatility in the choice of the bottom support that in practice may serve only as support.

The film may be made more or less sealable or stickable to any support material by tailoring the composition of the outer layer (a) of the top web. Consequently the bottom web may be simple, even a monomaterial rigid support, which can be cheap, thus reducing the overall packaging cost. Furthermore, the cross-linked EZO frangible blends is more reliable and characterized by a minor variability in opening performance.

The invention claimed is:

1. A cross-linked thermoplastic multilayer film for use as a top web in vacuum skin packaging (VSP) applications comprising at least an outer heat sealable layer (a); and a layer (b) directly adhered to the outer heat sealable layer (a) or adhered to the outer heat sealable layer (a) with the interposition of a layer (a')

wherein the layer outer heat sealable (a) and/or the layer (b) comprise a cross-linked easy opening frangible blend (B) of at least two chemically or physically incompatible polymers wherein the easy opening frangible blend (B) comprises at least one member selected from the group consisting of:

a: (i) an ethylene and acrylic acid or methacrylic acid copolymer, and (ii) a modified ethylene-vinyl acetate (EVA) copolymer;

b: (i) an ethylene and acrylic acid or methacrylic acid copolymer, and (iii) a polybutylene; or c: (ii) an ethylene homopolymer or copolymer or an EVA copolymer, and (iii) a polybutylene the cross-linked thermoplastic multilayer film for use as a top web in VSP applications having a total thickness of from 50 to 180 microns and an implosion resistance of at least 8 mm, and either i) a gel content of the film, wherein the polymers in the film are toluene-soluble before cross-linking not less than 60% by weight with respect to the film weight, measured in accordance with ASTM D-2765-01 or ii) a MFI of the film, measured at 230° C., 2.16 kg, according to ASTM D-1238, of less than or equal to 2 g/10 min.

2. The cross-linked thermoplastic multilayer film of claim 1, wherein the easy opening frangible blend (B) further comprises a third polymer.

3. The cross-linked thermoplastic multilayer film of claim 1, wherein the easy opening frangible blend (B) comprises at least one blend selected from the group consisting of a: (i) an ethylene and acrylic acid or methacrylic acid copolymer, (ii) a modified EVA copolymer and, b: (i) an ethylene and acrylic acid or methacrylic acid copolymer, (ii) a modified EVA copolymer and, (iii) a polybutylene;

c: (ii) an EVA copolymer and (iii) a polybutylene;

d. (ii) an ethylene homopolymer or copolymer and (iii) a polybutylene.

4. The cross-linked thermoplastic multilayer film of claim 1, further comprises a zinc ionomer.

5. The cross-linked thermoplastic multilayer film of claim 1, wherein the easy opening frangible blend (B) is a ternary blend comprising c: 35 to 83% by weight of (ii) the ethylene homopolymer or copolymer or EVA copolymer and 2% to 50% by weight of (iii) the polybutylene.

6. The cross-linked thermoplastic multilayer film of claim 1, wherein the frangible blend (B) consists of:

(i) more than 50% of an ethylene and acrylic acid or methacrylic acid copolymer and (ii) the complement to 100% of a modified EVA copolymer, or (i) more than 50% of an ethylene and acrylic acid or methacrylic acid copolymer and (iii) the complement to 100% of a polybutylene, or (ii) more than 50% of an ethylene homo or copolymer or an EVA copolymer and (iii) the complement to 100% of a polybutylene.

7. The cross-linked thermoplastic multilayer film according to claim 1, wherein layer (a') is absent.

8. The cross-linked thermoplastic multilayer film of claim 1, wherein only layer (b) comprises the easy opening frangible blend (B), and layer (b) comprises at least 50% of the frangible blend (B).

9. The cross-linked thermoplastic multilayer film of claim 1, wherein the thickness of the layer (a) is from 1 to 10 microns, and/or the thickness of layer (a'), is from 1 to 10 microns, and/or the thickness of the layer (b) is from 2 to 30 microns.

10. The cross-linked thermoplastic multilayer film of claim 1, further characterized by a cross-linking level as to have
    a gel content of the film, wherein the polymers in the film are toluene-soluble before cross-linking not less than 60% by weight with respect to the film weight, measured in accordance with ASTM D-2765-01; and
    a MFI of the film, measured at 230° C., 2.16 kg, according to ASTM D-1238, less than or equal to 2 g/10 min, and
    a formability score for both webbing and bridging (longitudinal and transverse) of at least 2.0, measured according to the formability test method.

11. An easy-to-open VSP package comprising:
    the cross-linked thermoplastic multilayer film according to claim 1;
    a support; and
    a product loaded onto said support,
    wherein said cross-linked thermoplastic multilayer film being draped over the product and sealed to the entire surface of the support is not covered by the product.

12. The easy-to-open VSP package of claim 11, wherein said support comprises a monolayer web or multilayer web, wherein the monolayer web or multilayer web does not comprise the easy opening frangible blend (B).

13. The easy-to-open VSP package of claim 11, wherein said support is a multilayer support comprising a seal layer and at least a bulk layer, said bulk layer comprising at least one member selected from the group consisting of polyethylene, HDPE, polystyrene, polyester, poly(vinyl chloride (PVC), polypropylene, polyamides, cardboard, and aluminum.

14. The easy-to-open VSP package of claim 11, wherein the support has at least one hole.

15. The easy-to-open VSP package of claim 11, wherein the product is a food product.

16. The easy-to-open VSP package of claim 11, wherein the easy-to-open VSP package is for microwave cook-in applications.

17. A vacuum skin packaging process for manufacturing an easy-to-open VSP package comprising
    providing the cross-linked thermoplastic multilayer film according to claim 1, comprising the outer heat sealable layer (a);
    providing a support;
    disposing the film over the support, with the outer heat sealable layer (a) facing the support;
    disposing a product between the cross-linked thermoplastic multilayer film and the support;
    heating the cross-linked thermoplastic multilayer film and moulding it down on and around the product and against the support, the space between the heated cross-linked thermoplastic multilayer film and the support having been evacuated to form a tight skin around the product; and
    tight sealing said cross-linked thermoplastic multilayer film to the entire surface of the support not covered by the product by differential air pressure.

18. A cross-linked thermoplastic multilayer film for use as a top web in vacuum skin packaging (VSP) applications comprising at least
    an outer heat sealable layer (a);
    a layer (b) directly adhered to the outer heat sealable layer (a) or adhered to the outer heat sealable layer (a) with the interposition of a layer (a'); and
    a thermoplastic layer (c) adjacent and directly bonded to layer (b),
    wherein the outer heat sealable layer (a) and the layer (a') and the layer (b) comprise a cross-linked easy opening frangible blend (B) of at least two chemically or physically incompatible polymers wherein the easy opening frangible blend (B) comprises at least one member selected from the group consisting of:
    a: (i) an ethylene and acrylic acid or methacrylic acid copolymer, and (ii) a modified ethylene-vinyl acetate (EVA) copolymer;
    b: (i) an ethylene and acrylic acid or methacrylic acid copolymer, and (iii) a polybutylene; or
    c: (ii) an ethylene homopolymer or copolymer or an EVA copolymer, and (iii) a polybutylene the cross-linked thermoplastic multilayer film for use as a top web in VSP applications having a total thickness of from 50 to 180 microns and an implosion resistance of at least 8 mm, and
    either i) a gel content of the film, wherein the polymers in the film are toluene-soluble before cross-linking not less than 60% by weight with respect to the film weight, measured in accordance with ASTM D-2765-01 or ii) a MFI of the film, measured at 230° C., 2.16 kg, according to ASTM D-1238, of less than or equal to 2 g/10 min.

19. The cross-linked thermoplastic multilayer film according to claim 18, wherein layer c) comprises (d) an outer abuse layer; and/or
    (e) an inner barrier layer; and/or
    (f) a bulk layer.

20. The cross-linked thermoplastic multilayer film according to claim 19, wherein said layer c) comprises two bulk layers f) and the inner barrier layer e), wherein the two bulk layers f) are positioned on the opposite sides with respect to the inner barrier layer e).

21. The cross-linked thermoplastic multilayer film of claim 20, wherein
    the outer heat sealable layer (a) comprises at least 50% comprises at least one member selected from the group consisting of ethylene homo- or co-polymers, ethylene/alpha-olefin copolymers, polypropylene, ethylene/acrylic acid copolymers, ethylene/methacrylic acid copolymers, ionomers, and ethylene-vinyl acetate copolymers (EVA), and/or
    said outer abuse layer (d), comprises at least 50% or of a polymer selected from the group consisting of ionomers, MDPE, HDPE and their blends, and/or
    said inner barrier layer (e), comprises at least 50% of a polymer selected from the group consisting of PVDC, polyamides, EVOH, and polyesters, and/or
    said bulk layer (f), comprises at least 50% of a polymer selected from the group consisting of low density polyethylene, ethylene-vinyl acetate copolymers, linear low density polyethylenes, linear very low density polyethylenes, and ionomers.

* * * * *